(12) United States Patent
Zhao et al.

(10) Patent No.: US 9,574,083 B2
(45) Date of Patent: Feb. 21, 2017

(54) SYNERGISTIC EFFECT OF MULTIPLE MOLD RELEASE ADDITIVES IN POLYCARBONATE BASED COMPOSITIONS

(71) Applicant: SABIC Global Technologies B.V., Bergen op Zoom (NL)

(72) Inventors: Wei Zhao, Mount Vernon, IN (US); Wilhelmus Johannes Daniel Steendam, Bergen op Zoom (NL); Amit Kulkarni, Evansville, IN (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 136 days.

(21) Appl. No.: 14/192,176

(22) Filed: Feb. 27, 2014

(65) Prior Publication Data

US 2015/0240073 A1    Aug. 27, 2015

(51) Int. Cl.
| | |
|---|---|
| *C08L 69/00* | (2006.01) |
| *C08J 3/20* | (2006.01) |
| *C08K 5/103* | (2006.01) |

(52) U.S. Cl.
CPC .............. *C08L 69/00* (2013.01); *C08J 3/203* (2013.01); *C08J 2369/00* (2013.01); *C08J 2409/06* (2013.01); *C08J 2423/02* (2013.01); *C08J 2425/10* (2013.01); *C08J 2425/12* (2013.01); *C08J 2435/02* (2013.01); *C08J 2435/04* (2013.01); *C08J 2451/04* (2013.01); *C08J 2469/00* (2013.01); *C08J 2471/02* (2013.01); *C08K 5/103* (2013.01); *C08L 2205/02* (2013.01)

(58) Field of Classification Search
CPC .................................................... C08L 69/00
See application file for complete search history.

(56) References Cited

U.S. PATENT DOCUMENTS

| | | | |
|---|---|---|---|
| 3,635,895 A | 1/1972 | Kramer et al. | |
| 3,645,992 A | 2/1972 | Elston | |
| 4,001,184 A | 1/1977 | Scott | |
| 4,217,438 A | 8/1980 | Brunelle et al. | |
| 4,701,432 A | 10/1987 | Welborn, Jr. | |
| 4,746,701 A | 5/1988 | Kress et al. | |
| 4,935,397 A | 6/1990 | Chang | |
| 4,937,299 A | 6/1990 | Ewen et al. | |
| 4,937,301 A | 6/1990 | Chang | |
| 5,055,438 A | 10/1991 | Canich | |
| 5,272,236 A | 12/1993 | Lai et al. | |
| 5,278,272 A | 1/1994 | Lai et al. | |
| 7,786,246 B2 | 8/2010 | Jansen et al. | |
| 8,017,697 B2 | 9/2011 | Carrillo et al. | |
| 2003/0158300 A1* | 8/2003 | Gorny | B32B 27/18 524/100 |
| 2008/0029744 A1* | 2/2008 | Jansen | C08L 55/02 252/601 |
| 2008/0033108 A1* | 2/2008 | Kung | C08L 55/02 525/67 |
| 2009/0036593 A1* | 2/2009 | DeRudder | C08L 55/02 524/506 |
| 2010/0137500 A1* | 6/2010 | Goossens | C08L 69/00 524/537 |

FOREIGN PATENT DOCUMENTS

| | | |
|---|---|---|
| EP | 0129368 | 12/1984 |
| EP | 0260999 | 3/1988 |
| EP | 0 437 707 A1 | 7/1991 |
| EP | 0 492 550 A1 | 7/1992 |
| WO | WO 90/07526 | 7/1990 |
| WO | WO 03/087210 A1 | 10/2003 |
| WO | WO 2009/017938 A1 | 2/2009 |

OTHER PUBLICATIONS

International Patent Application No. PCT/IB2015/051445: International Search Report and Written Opinion dated Jun. 5, 2015, 10 pages.

* cited by examiner

*Primary Examiner* — Michael Pepitone
(74) *Attorney, Agent, or Firm* — Baker & Hostetler LLP

(57) ABSTRACT

The present disclosure relates to a thermoplastic composition having a better mold release performance. The disclosed thermoplastic composition comprises polycarbonate components, an impact modifier and a mold release composition. Also disclosed is a method for making the disclosed thermoplastic composition and an article of manufacture comprising the disclosed polymer composition.

33 Claims, 1 Drawing Sheet

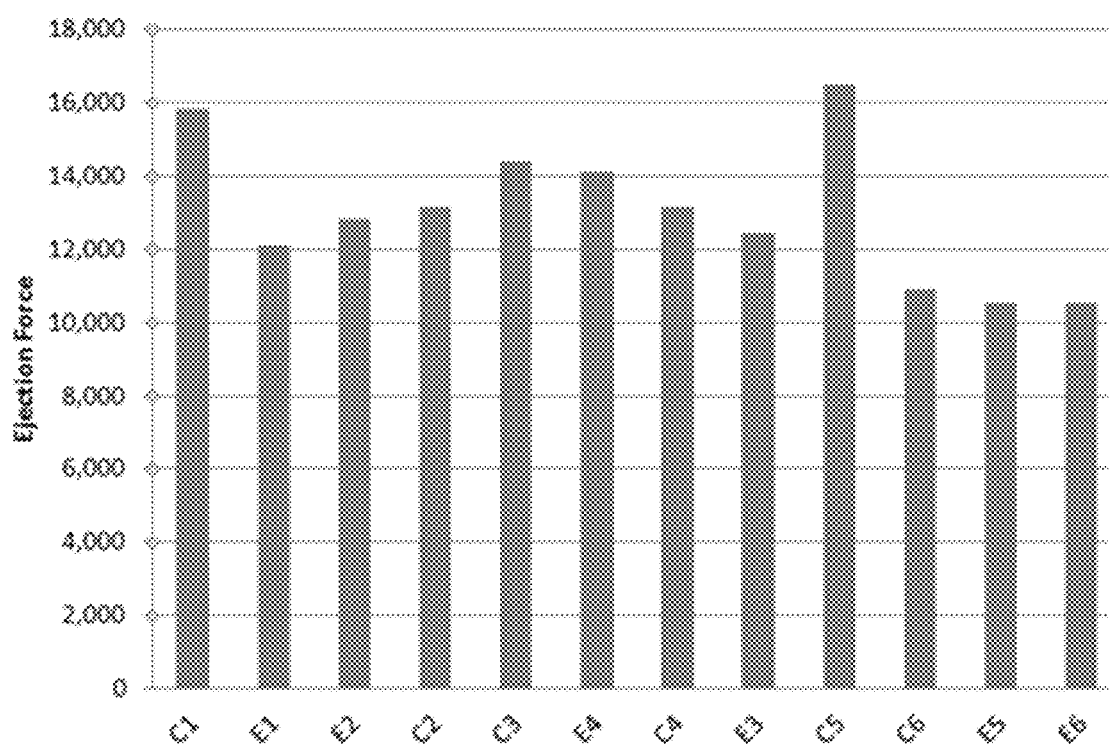

SYNERGISTIC EFFECT OF MULTIPLE MOLD RELEASE ADDITIVES IN POLYCARBONATE BASED COMPOSITIONS

BACKGROUND OF THE INVENTION

The rapid growth of the plastics industry and an ever-increasing use of polymeric materials have emphasized the need for more economical way for preparing various high quality articles from thermoplastic resins.

Injection molding provides a convenient way for preparing various articles. To keep injection mold articles manufacturing economically beneficial, the mold resident cycle should be kept to a minimum. This shorter cycle time provides a shorter resin heat period with consequently less thermal damage to the resin composition. To reduce or minimize cycle times, many manufactures are removing parts at higher temperatures. As a result the parts have a tendency to stick more easily in the mold, or become distorted as they are ejected from the mold, since the thermoplastic material is not as stiff as if it was allowed to cool longer.

Additionally, as many parts are becoming more complex, and as manufactures try to combine multiple parts into one larger part having more detail, there are more potential areas to stick in the mold.

Accordingly, it would be beneficial to provide improved thermoplastic compositions allowing for the part to be ejected at lower pressures or minimal force without cracking or other part deformation. This and other needs are satisfied by the various aspects of the present disclosure.

SUMMARY OF THE INVENTION

It is to be understood that both the following general description and the following detailed description are exemplary and explanatory only and are not restrictive, as claimed. This disclosure, in one aspect, relates to thermoplastic compositions comprising: (a) from about 10 wt % to about 80 wt % of a first polycarbonate; (b) an impact modifier composition from about 1 wt % to about 30 wt %; wherein the combined weight percent of components (a) through (b) does not exceed 100 wt %, and wherein all weight percent values are based on the total weight of the thermoplastic composition; and (c) a mold release composition comprising at least two different mold release additives from about 0.01 parts by weight to about 1.5 parts by weight added to 100 parts by weight of the thermoplastic composition excluding the mold release composition wherein one or more of the at least two different mold release additives comprises pentaerithritol tetrastearate (PETS), glycerol monostearate (GMS), glycerol tristearate, poly(alfa) olefin, poly(ethylene oxide-propylene oxide-ethylene oxide), or any combination thereof; and wherein a molded sample of the thermoplastic composition has better mold release performance compared to a substantially identical reference composition in the absence of the mold release composition, and wherein the presence of the mold release composition has no or substantially no impact on the mechanical and physical properties.

In one aspect, the at least two different mold release additives comprise PETS in an amount higher than a second one of the at least two mold release additives. In yet another aspect, the mold release composition comprises at least two of the mold release additives that are present in the weight ratio in the range from about 10:1 to about 1:1.

In one aspect, as embodied and broadly described herein, this disclosure relates to a thermoplastic composition comprising (a) from about 10 wt % to about 40 wt % of a first polycarbonate; (b) from about 20 wt % to about 60 wt % of a second polycarbonate; (c) an impact modifier composition from about 1 wt % to about 30 wt %; (d) from greater than 0 to about 10 wt % of a third polycarbonate comprising a polycarbonate polysiloxane copolymer; wherein the combined weight percent of components (a) through (d) does not exceed 100 wt %, wherein all weight percent values are based on the total weight of the thermoplastic composition; and (e) a mold release composition comprising at least two different mold release additives from about 0.01 parts by weight to about 1.5 parts by weight added to 100 parts of the thermoplastic composition excluding the mold release composition, wherein at least two of the mold release additives are in the weight ratio in the range of greater than 1:1 to about 10:1; and wherein a molded sample of the thermoplastic composition has better mold release performance compared to a substantially identical reference composition in the absence of the mold release composition, and wherein the presence of the mold release composition has substantially no impact on the mechanical and physical properties.

Also disclosed are methods of forming the disclosed thermoplastic compositions. The methods can comprise: (a) providing: (i) a first polycarbonate in an amount in the range from about 10 wt % to about 80 wt %; (ii) an impact modifier composition in an amount in the range from about 1 wt % to about 30 wt %; (b) mixing all components to create a mixture that does not exceed 100 wt %, and wherein all weight percent value are based on the total weight of the thermoplastic composition; (c) blending a mold release composition in an amount in the range from about 0.01 parts by weight to about 1.5 parts by weight into 100 parts of the mixture excluding the mold release composition to form a thermoplastic composition, wherein one or more of the at least two different mold release additives comprises PETS, GMS, glycerol tristearate, poly(alfa) olefin, poly(ethylene oxide-propylene oxide-ethylene oxide), or any combination thereof, wherein a molded sample of the thermoplastic composition has better mold release performance compared to a substantially identical reference composition in the absence of the mold release composition, and wherein the presence of the mold release composition has substantially no impact on the mechanical and physical properties.

In one aspect, disclosed herein is a method of forming a thermoplastic composition comprising (a) providing: (i) a first polycarbonate in an amount in the range from about 10 wt % to about 40 wt %; (ii) a second polycarbonate in an amount in the range from about 20 wt % to about 60 wt %; (iii) an impact modifier composition in an amount in the range from about 1 wt % to about 30 wt %; (iv) a third polycarbonate composition comprising a polycarbonate-polysiloxane copolymer in an amount in the range from greater than 0 to about 10 wt %; (b) mixing all components to create a mixture that does not exceed 100 wt %, and wherein all weight percent value are based on the total weight of the thermoplastic composition; (c) blending a mold release composition in an amount in the range from about 0.01 parts by weight to about 1.5 parts by weight into 100 parts of the mixture excluding the mold release composition to form a thermoplastic composition wherein at least two of the mold release additives are in the weight ratio in the range of greater than 1:1 to about 10:1, and wherein a molded sample of the thermoplastic composition has better mold release performance compared to a substantially identical reference composition in the absence of the mold release composition, and wherein the presence of the mold release composition has substantially no impact on the mechanical and physical properties.

In still further aspects, also disclosed herein are articles of manufacture comprising the disclosed compositions.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Other advantages will be set forth in part in the description which follows or may be learned by practice. The advantages will be realized and attained by means of the elements and combinations particularly pointed in the appended claims. It is to be understood that both the foregoing general description and the following detailed description are exemplary and explanatory only and are not restrictive, as claimed.

BRIEF DESCRIPTION OF THE FIGURES

The accompanying drawing, which is incorporated in and constitutes a part of this specification, illustrates embodiments and together with the description, serves to explain the principles of the present disclosure: FIG. 1 is a schematic representation of mold release chart for the thermoplastic compositions having various mold release compositions.

DETAILED DESCRIPTION OF THE INVENTION

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

DEFINITIONS

It is to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Disclosed are component materials to be used to prepare disclosed compositions of the invention as well as the thermoplastic compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the thermoplastic compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article denotes the weight relationship between the element or component and any other elements or components in the thermoplastic composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

Compounds disclosed herein are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulfur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula $AOA^1$, where A and $A^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocycloalkyl group described above.

As used herein, the terms "number average molecular weight" or "Mn" can be used interchangeably, and refer to the statistical average molecular weight of all the polymer chains in the sample and is defined by the formula:

$$Mn = \frac{\sum N_i M_i}{\sum N_i},$$

where $M_i$ is the molecular weight of a chain and $N_i$ is the number of chains of that molecular weight. Mn can be determined for the disclosed nitrogen containing polymers, such as polyetherimides, polyamides, polyurethanes, or polyimides, by methods well known to a person having ordinary skill in the art. It is to be understood that as used herein, Mn is measured gel permeation chromatography (GPC) and as calibrated with polystyrene standards. For example, GPC can be carried out using a crosslinked styrene-divinyl benzene column, at a sample concentration of 1 milligram per milliliter with appropriate mobile phase solvents.

As used herein, the terms "weight average molecular weight" or "Mw" can be used interchangeably, and are defined by the formula:

$$Mw = \frac{\sum N_i M_i^2}{\sum N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured GPC. In some cases, Mw is measured GPC and calibrated with polystyrene standards. Gel permeation chromatography can be carried out using a crosslinked styrene-divinyl benzene column, at a sample concentration of about 1 milligram per milliliter with appropriate mobile phase solvents.

As used herein, the terms "polydispersity index" or "PDI" can be used interchangeably, and are defined by the formula:

$$PDI = \frac{Mw}{Mn}.$$

The PDI has a value equal to or greater than 1, but as the polymer chains approach uniform chain length, the PDI approaches unity.

As used herein, the terms "mean" or "statistical mean", can be used interchangeably, and are defined by the formula:

$$\bar{x} = \frac{1}{n} \cdot \sum_{i=1}^{n} x_i$$

wherein $x_i$ is the measured value, and n is the number of values.

As used herein, the term "variance" refers to a numerical value that is used to indicate how widely the measured values in a group vary, and is defined by the formula:

$$\sigma^2 = \frac{\sum (x_i - \bar{x})^2}{n},$$

wherein $\sigma^2$ is a variance, $x_i$ is the measured value, $\bar{x}$ is the mean value, and n is the number of values.

The index "n" as used herein in connection with polymer structures, refers to a number of repeating units in a polymer composition. According to aspects, the value of "n" can be any integer greater than 1.

The terms "polyamide" or "polyamides" as used herein refer to any one of a class of synthetic polymeric materials containing a recurring —CONH— group.

The term "polyimides" refers to a polymer of imide monomers.

The term "mold release composition" as used herein refers to at least one chemical or additive which, when added to a polymer composition, prevents or substantially prevents, the polymer composition from bonding to surfaces. In another aspect, the "mold release composition" refers to at least one chemical or additive which, when added to a polymer composition assists in ejecting a part made from the polymer composition at lower pressures or minimal force. In yet another aspect, the "mold release composition" refers to at least one chemical or additive which, when added to a polymer composition assists in ejection a part made from the polymer composition without cracking or part deformation.

The terms "cracking performance" or "mold release performance" are used interchangeably, and refer to the ability of the thermoplastic composition to withstand stress. In one aspect and as defined herein the stress includes by not limited to mechanical stress, and temperature stress.

The terms "mechanical and physical properties" as used herein, refer to any properties that describe desired polymer performance in rest and under stress. In one aspect, mechanical and physical properties can include without limitation density, toughness, viscoelasticity, impact properties, and modulus. In another aspect, the mechanical and physical properties can be defined by any standard test known to one of ordinary skills in the art. In one aspect standard tests can include but are not limited to measurements of heat deflection temperature (HDT), notched and unnotched Izod impact (NII, UII), ductility, flexural capabilities (modulus and strength), melt volume rate (MVR), ejection forces, toughness, elongation and the like.

As used herein, the term "substantially no impact" describes that no change in the measured mechanical and physical properties is observed with a confidence level of at least about 95%. In one aspect, the measurement of the mechanical and physical properties for control and inventive samples demonstrates similar results with a confidence level of at least about 95%. In another aspect and without limitations, the measured mechanical and physical properties include but are not limited to, flex modulus, flex strength, heat deflection temperature, Notched Izod strength and ductility.

As used herein, the term "substantially identical reference composition" refers to a composition that is substantially identical to the inventive composition by consisting essentially of substantially the same proportions and components but in the absence of a stated component. For example and without limitation, in some aspects of the invention, for purposes of comparison to a corresponding reference composition, as used herein, corresponding reference composition consists essentially of the same component materials in the same component amounts as the inventive composition but for the absence of the mold release composition.

The terms "residues" and "structural units" as used in reference to the constituents of the polymers, are synonymous throughout the specification.

Each of the component materials disclosed herein are either commercially available and/or the methods for the production thereof are known to those of ordinary skill in the art.

It is understood that the thermoplastic compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

I. THERMOPLASTIC COMPOSITION

As summarized above, the disclosure provides a thermoplastic composition having a better mold release performance compared to a substantially identical reference composition in the absence of the mold release composition, and wherein the presence of the mold release composition has substantially no impact on the mechanical and physical properties. In one aspect, the thermoplastic polymer used in the thermoplastic composition of the invention is an organic polymer. In this aspect, the organic polymer is selected from a wide variety of thermoplastic resins or blends of thermoplastic resins. The thermoplastic polymer also includes blends of one or more thermoplastic resins with one or more thermosetting resins. The thermoplastic polymer can also be a blend of polymers, copolymers, terpolymers, or combinations including at least one of the foregoing organic polymers.

In one aspect, the thermoplastic composition comprises (a) a first polycarbonate in an amount from about 10 wt % to about 80 wt %, (b) an impact modifier composition in an amount from about 1 wt % to about 30 wt %, wherein the combined weight percent of components (a) through (b) does not exceed 100 wt %, wherein all weight percent values are based on the total weight of the thermoplastic composition; and (c) a mold release composition comprising at least two different mold release additives from about 0.01 parts by weight to about 1.5 parts by weight added to 100 parts by weight of the thermoplastic composition excluding the mold release composition, wherein one or more of the at least two different mold release additives comprises PETS, GMS, glycerol tristearate, poly(alfa) olefin, poly(ethylene oxide-propylene oxide-ethylene oxide), or any combination thereof; and wherein a molded sample of the thermoplastic blend composition has better mold release performance compared to a substantially identical reference composition in the absence of the mold release composition. The presence of the mold release composition has substantially no impact on the mechanical and physical properties. In one aspect, the molded sample of the thermoplastic composition has lower ejection pressure compared to a substantially identical reference composition in the absence of the mold release composition, and wherein the presence of the mold release composition has substantially no impact on the mechanical and physical properties In one aspect, the thermoplastic composition comprises a mold release composition comprising at least two different mold release additives. In one aspect, one or more of the at least two different mold release additives comprises PETS, GMS, glycerol tristearate, poly(alfa) olefin, poly(ethylene oxide-propylene oxide-ethylene oxide), or any combination thereof. In another aspect, the at least two different mold release additives comprise PETS in an amount higher than a second one of the at least two mold release additives.

In one aspect, the thermoplastic composition can further comprise a second polycarbonate in an amount from about 10 wt % to about 80 wt %.

In another aspect, the thermoplastic composition can further comprise a third polycarbonate component in an amount in the range from greater than 0 wt % to about 15 wt %. In one aspect, the third polycarbonate can be different from the first or second polycarbonate.

In one aspect, the first polycarbonate can be present in any effective amount to form the thermoplastic composition having a better mold release performance compared to a substantially identical reference composition in the absence of the mold release composition, and wherein the presence of the mold release composition has substantially no impact on the mechanical and physical properties. In one aspect, the first polycarbonate is present in amount from about 10 wt % to about 80 wt % including exemplary amounts of about 15 wt %, 20 wt %, 25 wt %, 30 wt %, 35 wt %, 40 wt %, 45 wt %, 50 wt %, 55 wt %, 60 wt %, 65 wt %, 70 wt %, and about 75 wt %. In still further aspects, the first polycarbonate can be present in any range derived from any two values set forth above.

In one aspect, the second polycarbonate is present in amount from about 10 wt % to about 80 wt %, including exemplary amounts of about 15 wt %, 20 wt %, 25 wt %, 30 wt %, 35 wt %, 40 wt %, 45 wt %, 50 wt %, 55 wt %, 60 wt %, 65 wt %, 70 wt %, and about 75 wt %. In still further aspects, the second polycarbonate can be present in any range derived from any two values set forth above.

In one aspect, the second polycarbonate is different from the first polycarbonate. In one aspect, the second polycarbonate can be differentiated from the first polycarbonate on a weight average molecular weight basis. In yet another aspect, the second polycarbonate can be differentiated from the first polycarbonate on a linearity or number of branched moieties basis.

In one aspect, the first polycarbonate has a weight average molecular weight in the range from about 10,000 Daltons to about 100,000 Daltons, including exemplary values of about 25,000 Daltons, 30,000 Daltons, 35,000 Daltons, 40,000 Daltons, 45,000 Daltons, 50,000 Daltons, 55,000 Daltons, 60,000 Daltons, 65,000 Daltons, 70,000 Daltons, 75,000 Daltons, 80,000 Daltons, 85,000 Daltons, 90,000 Daltons, and about 95,000 Daltons. In a further aspect, the weight average molecular weight of the first polycarbonate can be in any range derived from any two values set forth above. For example, the weight average molecular weight of the first polycarbonate can be in the range of from about 18,000 Daltons to about 26,000 Daltons, from about 20,000 Daltons to about 70,000 Daltons, from about 25,000 Daltons to about 50,000 Daltons, from about 30,000 Daltons to about 40,000 Daltons, from about 18,000 Daltons to about 34,000 Daltons. In one aspect, the weight average molecular weight of the first polycarbonate can be 21,900 Daltons.

In one aspect, the second polycarbonate has a weight average molecular weight in the range from about 10,000 Daltons to about 100,000 Daltons, including exemplary values of about 25,000 Daltons, 30,000 Daltons, 35,000 Daltons, 40,000 Daltons, 45,000 Daltons, 50,000 Daltons, 55,000 Daltons, 60,000 Daltons, 65,000 Daltons, 70,000 Daltons, 75,000 Daltons, 80,000 Daltons, 85,000 Daltons, 90,000 Daltons, and about 95,000 Daltons. In a further aspect, the weight average molecular weight of the second polycarbonate can be in any range derived from any two values set forth above. For example, the weight average molecular weight of the second polycarbonate can be in the range of from about 18,000 Daltons to about 34,000 Daltons, from about 20,000 Daltons to about 70,000 Daltons, from about 25,000 Daltons to about 50,000 Daltons, from about 26,000 Daltons to about 34,000 Daltons, from about 30,000 Daltons to about 40,000 Daltons. In another aspect, the weight average molecular weight of the second polycarbonate can be 29,900 Daltons.

In one aspect, the first polycarbonate comprises 2,2-bis (4-hydroxyphenyl)propane (BPA) polycarbonate. In another aspect, the second polycarbonate comprises BPA polycarbonate that is different from the first polycarbonate.

In one aspect, the thermoplastic composition comprises a third polycarbonate component. In one aspect, the third polycarbonate component can be present in amount from greater than 0 wt % to about 15 wt %, including exemplary amounts of 0.01 wt %, 0.1 wt %, 0.5 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, and 14 wt %. In a further aspect, the third polycarbonate component can be present in any amount in any range derived from any two values set forth above. For example, the third polycarbonate component can be present in an amount in the range of from about 0.1 wt % to about 10 wt %, from about 1 wt % to about 7 wt %, or from about 3 wt % to about 7 wt %.

In one aspect, the third polycarbonate component is different from the first polycarbonate, or the second polycarbonate. In one aspect, the third polycarbonate comprises a polycarbonate-polysiloxane copolymer. In one aspect, the polycarbonate-polysiloxane copolymers have a weight average molecular weight of about 10,000 Daltons to about 200,000 Daltons, including exemplary weight average molecular weight of about 15,000 Daltons, 20,000 Daltons, 30,000 Daltons, 40,000 Daltons, 50,000 Daltons, 60,000 Daltons, 70,000 Daltons, 80,000 Daltons, 90,000 Daltons, 100,000 Daltons, 110,000 Daltons, 120,000 Daltons, 130,000 Daltons, 140,000 Daltons, 150,000 Daltons, 160,000 Daltons, 170,000 Daltons, 180,000 Daltons, and 190,000 Daltons. In a further aspect, the weight average molecular weight of the polycarbonate-polysiloxane copolymers can be in any range derived from any two values set forth above. For example, the weight average molecular weight of the second polycarbonate can be in the range of from about 20,000 Daltons to about 150,000 Daltons, or from about 40,000 Daltons to about 100,000 Daltons.

In one aspect, the thermoplastic composition comprise an impact modifier composition present in an amount from about 1 wt % to about 30 wt %, including exemplary amounts of about 2 wt %, 3 wt %, 4 wt %, 5 wt %, 6 wt %, 7 wt %, 8 wt %, 9 wt %, 10 wt %, 11 wt %, 12 wt %, 13 wt %, 14, wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, and about 29 wt %. In still further aspects, the impact modifiers can be present in any range derived from any two values set forth above.

In one aspect, the impact modifier composition can comprise one or more impact modifier components. In another aspect, the impact modifier composition can comprise one or more of an acrylonitrile-butadiene-styrene (ABS) polymer component, a methyl methacrylate-butadiene-styrene (MBS) polymer component, a bulk polymerized ABS (BABS) polymer component, a styrene-acrylonitrile (SAN) copolymer component, a styrene acrylonitrile grafted ABS component, or any combination thereof.

In some aspects, the impact modifier composition can comprise one or more of the SAN grafted ABS component, the MBS component, or the SAN. In one aspect, a butadiene content in the SAN grafted ABS component is in the range from about 10 wt % to about 70 wt %, including exemplary amounts of 12 wt %, 14 wt %, 16 wt %, 18 wt %, 20 wt %, 22 wt %, 24 wt %, 26 wt %, 28 wt %, 30 wt %, 32 wt %, 34 wt %, 36 wt %, 38 wt %, 40 wt %, 42 wt %, 44 wt %, 46 wt %, 48 wt %, 50 wt %, 52 wt %, 54 wt %, 56 wt %, 58 wt %, 60 wt %, 62 wt %, 64 wt %, 66 wt %, and 68 wt %. In a further aspect, the butadiene content is in an mount in any range derived from any two values set forth above. For example, the butadiene content can be present in an amount in the range of from about 11 wt % to about 67 wt %, from about 15 wt % to about 63 wt %. In one aspect the butadiene content is at least about 16 wt %.

In one aspect, the thermoplastic composition further comprises a stabilizer composition in amount from greater than 0 wt % to about 1.5 wt %, including exemplary amount of 0.01 wt %, 0.02 wt %, 0.03 wt %, 0.04 wt %, 0.05 wt %, 0.06 wt %, 0.07 wt %, 0.0.8 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, and 1.4 wt %. In a further aspect, the stabilizer composition can be present in an amount in any range derived from any two values set forth above. For example, the stabilizer composition can be present in an amount in the range of from about 0.1 wt % to about 1.2 wt %, or from about 0.1 wt % to about 1.0 wt %.

In one aspect, the stabilizer composition can comprise one or more of heat stabilizers, UV stabilizer, or a combination thereof.

In one aspect, the thermoplastic composition comprises a mold release composition comprising at least two different mold release additives. In one aspect the mold release composition is present in an amount in the range from about 0.001 parts by weight to about 1.5 parts by weight added to the 100 parts by weight of the thermoplastic composition excluding the mold release composition. In a further aspect, the mold release composition is present in exemplary amounts of about 0.005 parts by weight, 0.01 parts by weight, 0.02 parts by weight, 0.03 parts by weight, 0.04 parts by weight, 0.05 parts by weight, 0.06 parts by weight, 0.07 parts by weight, 0.08 parts by weight, 0.09 parts by weight, 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1.0 parts by weight, 1.1 parts by weight, 1.2 parts by weight, 1.3 parts by weight, and about 1.4 parts by weight added to the 100 parts by weight of the thermoplastic composition excluding the mold release composition. In still further aspect, the mold release composition can be present in any range derived from the above values. For example, the mold release composition can be present in the thermoplastic composition in an amount in the range from about 0.005 parts per weight to about 1.5 parts per weight, or even from about 0.01 parts per weight to about 0.5 parts per weight added to the 100 parts by weight of the thermoplastic composition excluding the mold release composition.

In one aspect, the thermoplastic composition comprising the mold release composition has better mold release performance compared to a substantially identical reference composition in the absence of the mold release composition, and wherein the presence of the mold release composition has substantially no impact on the mechanical and physical properties.

In one aspect, the mold release composition comprises at least two mold release additives comprising PETS, GMS, glycerol tristearate, poly(alfa) olefin, poly(ethylene oxide-propylene oxide-ethylene oxide), or any combination thereof.

In another aspect, the mold release additives in the mold release composition can be present in any weight ratio. In one aspect, the weight ratio of at least two mold release additives present in the mold release composition can be in the range from about 1:1 to about 10:1, including exemplary values of 2:1, 3:1, 4:1, 5:1, 6:1, 7:1, 8:1, and 9:1. In still further aspect, at least two mold release additives can be present in the mold release composition in any weight ratio derived from the above values.

In further aspects, the at least two different mold release additives comprise PETS in an amount higher than a second one of the at least two mold release additives.

In one aspect, the thermoplastic composition comprising the mold release composition has lower ejection pressure compared to a substantially identical reference composition in the absence of the mold release composition, and wherein the presence of the mold release composition has substantially no impact on the mechanical and physical properties.

In one aspect, the thermoplastic composition comprises (a) from about 10 wt % to about 40 wt % of a first polycarbonate; (b) from about 20 wt % to about 60 wt % of a second polycarbonate; (c) an impact modifier composition from about 1 wt % to about 30 wt %; (d) from greater than 0 to about 10 wt % of a third polycarbonate comprising a polycarbonate polysiloxane copolymer; wherein the combined weight percent of components (a) through (d) does not exceed 100 wt %, wherein all weight percent values are based on the total weight of the thermoplastic composition; and (e) a mold release composition comprising at least two different mold release additives from about 0.01 parts by weight to about 1.5 parts by weight added to 100 parts of the thermoplastic composition excluding the mold release composition, wherein at least two of the mold release additives are in the weight ratio in the range of greater than 1:1 to about 10:1; and wherein a molded sample of the thermoplastic blend composition has better mold release performance compared to a substantially identical reference composition in the absence of the mold release composition, and wherein the presence of the mold release composition has substantially no impact on the mechanical and physical properties.

A. Polycarbonates

In one aspect, the disclosed blended thermoplastic compositions comprise a polycarbonate polymer composition wherein the polycarbonate polymer comprises BPA, a polycarbonate copolymer, polyester carbonate polymer, or polycarbonate-polysiloxane copolymer, or combinations thereof.

In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods. The term polycarbonate can be further defined as compositions have repeating structural units of the formula (1):

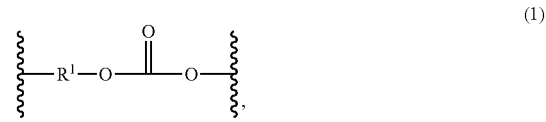

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

$$-A^1-Y^1-A^2- \qquad (2),$$

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

In a further aspect, polycarbonates can be produced by the interfacial reaction of dihydroxy compounds having the formula HO—$R^1$—OH, which includes dihydroxy compounds of formula (3):

$$\text{HO-}A^1\text{-}Y^1\text{-}A^2\text{-OH} \qquad (3),$$

wherein $Y^1$, $A^1$ and $A^2$ are as described above. Also included are bisphenol compounds of general formula (4):

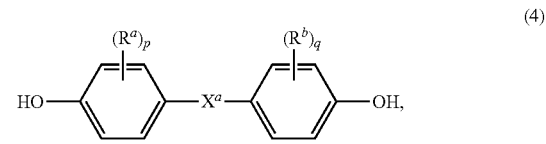

wherein $R^a$ and $R^b$ each represent a halogen atom or a monovalent hydrocarbon group and can be the same or different; p and q are each independently integers from 0 to 4; and $X^a$ represents one of the groups of formula (5):

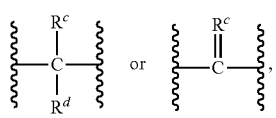

wherein $R^c$ and $R^d$ each independently represent a hydrogen atom or a monovalent linear or cyclic hydrocarbon group and $R^e$ is a divalent hydrocarbon group.

In various aspects, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group can have 3 to 20 atoms, and can be a single saturated or unsaturated ring, or fused polycyclic ring system wherein the fused rings are saturated, unsaturated, or aromatic.

In various aspects, examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis(4-hydroxyphenyl)phthalimidine, 2-phenyl-3,3-bis-(4-hydroxyphenyl) phthalimidine, and the like, as well as mixtures including at least one of the foregoing dihydroxy compounds.

In a further aspect, examples of the types of bisphenol compounds that can be represented by formula (3) includes 1,1-bis(4-hydroxyphenyl)methane, 1,1-bis(4-hydroxyphenyl)ethane, BPA, 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, and 1,1-bis(4-hydroxy-t-butylphenyl)propane. Combinations including at least one of the foregoing dihydroxy compounds can also be used.

In various further aspects, bisphenols containing substituted or unsubstituted cyclohexane units can be used, for example bisphenols of formula (6):

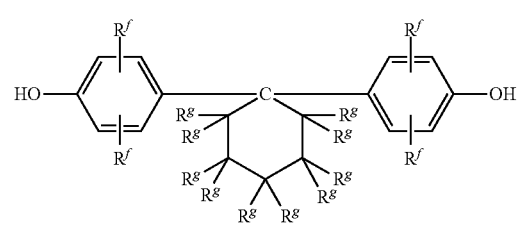

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

In further aspects, additional useful dihydroxy compounds are those compounds having the formula HO—$R^1$—OH include aromatic dihydroxy compounds of formula (7):

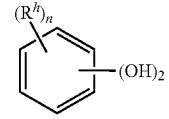

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

In addition to the polycarbonates described above, combinations of the polycarbonate with other thermoplastic polymers, for example combinations of homopolycarbonates and/or polycarbonate copolymers, can be used.

In various aspects, a polycarbonate can employ two or more different dihydroxy compounds or a copolymer of a dihydroxy compounds with a glycol or with a hydroxy- or acid-terminated polyester or with a dibasic acid or hydroxy acid in the event a carbonate copolymer rather than a homopolymer is desired for use. Polyarylates and polyestercarbonate resins or their blends can also be employed.

Branched polycarbonates are also useful, as well as blends of linear polycarbonate and a branched polycarbonate. The branched polycarbonates can be prepared by adding a branching agent during polymerization.

In a further aspect, the branching agents include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of from 0.05-2.0 weight percent. Branching agents and procedures for making branched polycarbonates are described in U.S. Pat. Nos. 3,635,895 and 4,001,184. All types of polycarbonate end groups are contemplated as being useful in the thermoplastic composition.

In a further aspect, the polycarbonate can be a linear homopolymer derived from BPA, in which each of $A^1$ and $A^2$ is p-phenylene and $Y^1$ is isopropylidene. The polycarbonates generally can have an intrinsic viscosity, as determined in chloroform at 25° C., of 0.3 to 1.5 deciliters per gram (dl/g), specifically 0.45 to 1.0 dl/g. The polycarbonates can have a weight average molecular weight (Mw) of 10,000 to 100,000 g/mol, as measured by GPC using a crosslinked styrene-divinyl benzene column, at a sample concentration of 1 milligram per milliliter, and as calibrated with polycarbonate standards. In a yet further aspect, the polycarbonate has an Mw of about 15,000 to about 55,000. In an even further aspect, the polycarbonate has an Mw of about 18,000 to about 40,000.

In a further aspect, a polycarbonate component used in the formulations of the present invention can have an MVR measures the rate of extrusion of a thermoplastics through an orifice at a prescribed temperature and load. Polycarbonates useful for the formation of articles can have an MVR, measured at 300° C. under a load of 1.2 kg according to ASTM D1238-04 or ISO 1133, of 0.5 to 80 cubic centimeters per 10 minutes (cc/10 min). In a still further aspect, the polycarbonate component comprises a two polycarbonate polymers wherein one of the polycarbonate polymers is a poly(aliphatic ester)-polycarbonate. In cases where the polycarbonate components comprises a non-poly(aliphatic ester)-polycarbonate and a poly(aliphatic ester)-polycarbonate, the non-poly(aliphatic ester)-polycarbonate (or a combination of such polycarbonates) can have an MVR measured at 300° C. under a load of 1.2 kg according to ASTM D1238-04 or ISO 1133, of 45 to 75 cc/10 min, specifically 50 to 70 cc/10 min, and more specifically 55 to 65 cc/10 min.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate or polyester carbonate. Such copolymers further contain carbonate units derived from oligomeric ester-containing dihydroxy compounds (also referred to herein as hydroxy end-capped oligomeric acrylate esters).

In various further aspects, "polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), units of formula (8):

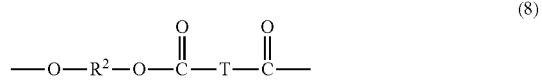

wherein $R^2$ is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T is a divalent group derived from a dicarboxylic acid (aliphatic, aromatic, or alkyl aromatic), and can be, for example, a $C_{4-18}$ aliphatic group, a $C_{6-20}$ alkylene group, a $C_{6-20}$ alkylene group, a $C_{6-20}$ alicyclic group, a $C_{6-20}$ alkyl aromatic group, or a $C_{6-20}$ aromatic group. $R^2$ can be is a $C_{2-30}$ alkylene group having a straight chain, branched chain, or cyclic (including polycyclic) structure. Alternatively, $R^2$ can be derived from an aromatic dihydroxy compound of formula (4) above, or from an aromatic dihydroxy compound of formula (7) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Examples of specific dicarboxylic acids are terephthalic acid, isophthalic acid, naphthalene dicarboxylic acid, cyclohexane dicarboxylic acid, or combinations thereof. In various aspects, an example of a specific dicarboxylic acid comprises a combination of isophthalic acid and terephthalic acid wherein the weight ratio of isophthalic acid to terephthalic acid is about 91:9 to about 2:98. In another aspect, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a further aspect, the thermoplastic composition comprises a polyester-polycarbonate copolymer, and specifically a polyester-polycarbonate copolymer in which the ester units of formula (8) comprise soft block ester units, also referred to herein as aliphatic dicarboxylic acid ester units. Such a polyester-polycarbonate copolymer comprising soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and can be straight chain (i.e., unbranched) or branched chain dicarboxylic acids, cycloalkyl or cycloalkylidene-containing dicarboxylic acids units, or combinations of these structural units. In a still further aspect, the $C_{6-20}$ aliphatic dicarboxylic acid ester unit includes a straight chain alkylene group comprising methylene (—CH$_2$—) repeating units. In a yet further aspect, a useful soft block ester unit comprises units of formula (8a):

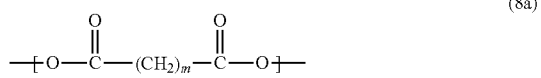

(8a)

where m is 4 to 18. In a further aspect of formula (8a), m is 8 to 10. The poly(aliphatic ester)-polycarbonate can include less than or equal to 25 wt % of the soft block unit. In a still further aspect, a poly(aliphatic ester)-polycarbonate comprises units of formula (8a) in an amount of 0.5 to 10 wt %, specifically 1 to 9 wt %, and more specifically 3 to 8 wt %, based on the total weight of the poly(aliphatic ester)-polycarbonate.

The poly(aliphatic ester)-polycarbonate is a copolymer of soft block ester units and carbonate units. The poly(aliphatic ester)-polycarbonate is shown in formula (8b):

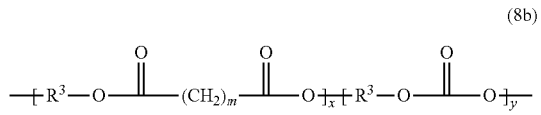

(8b)

where each R$^3$ is independently derived from a dihydroxyaromatic compound of formula (4) or (7), m is 4 to 18, and x and y each represent average weight percentages of the poly(aliphatic ester)-polycarbonate where the average weight percentage ratio x:y is 10:90 to 0.5:99.5, specifically 9:91 to 1:99, and more specifically 8:92 to 3:97, where x+y is 100.

Soft block ester units, as defined herein, can be derived from an alpha, omega C$_{6-20}$ aliphatic dicarboxylic acid or a reactive derivative thereof. In a further aspect, the soft block ester units can be derived from an alpha, omega C$_{10-12}$ aliphatic dicarboxylic acid or a reactive derivative thereof. In a still further aspect, the carboxylate portion of the aliphatic ester unit of formula (8a), in which the terminal carboxylate groups are connected by a chain of repeating methylene (—CH$_2$—) units (where m is as defined for formula (8a)), is derived from the corresponding dicarboxylic acid or reactive derivative thereof, such as the acid halide (specifically, the acid chloride), an ester, or the like. Exemplary alpha, omega dicarboxylic acids (from which the corresponding acid chlorides can be derived) include alpha, omega C$_6$ dicarboxylic acids such as hexanedioic acid (also referred to as adipic acid); alpha, omega C$_{10}$ dicarboxylic acids such as decanedioic acid (also referred to as sebacic acid); and alpha, omega C$_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the C$_{6-20}$ limitation can be used. In various further aspects, the poly(aliphatic ester)-polycarbonate having soft block ester units comprising a straight chain methylene group and a BPA polycarbonate group is shown in formula (8c):

where m is 4 to 18 and x and y are as defined for formula (8b). In a specific exemplary aspect, a useful poly(aliphatic ester)-polycarbonate copolymer comprises sebacic acid ester units and BPA carbonate units (formula (8c), where m is 8, and the average weight ratio of x:y is 6:94).

Desirably, the poly(aliphatic ester)-polycarbonate has a glass transition temperature (Tg) of 110 to 145° C., specifically 115 to 145° C., more specifically 120 to 145° C., more specifically 128 to 139° C., and still more specifically 130 to 139° C.

In one aspect, polycarbonates, including polyester-polycarbonates, can be manufactured by processes such as interfacial polymerization and melt polymerization.

The polycarbonate compounds and polymers disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide (OH$^-$), superoxide (O$^{2-}$), thiolate (HS$^-$), sulfide (S$^{2-}$), a C$_{1-20}$ alkoxide, a C$_{6-20}$ aryloxide, a C$_{1-20}$ carboxylate, a phosphate including biphosphate, a C$_{1-20}$ phosphonate, a sulfate including bisulfate, sulfites including bisulfites and metabisulfites, a C$_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediaminetetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline

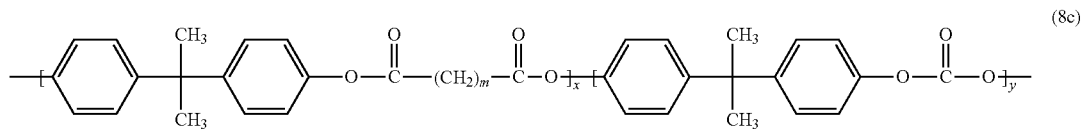

(8c)

earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including a polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired weight average molecular weight, Tg and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as GPC. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

Polycarbonates, including polyester-polycarbonates, can be also be manufactured by interfacial polymerization. Although the reaction conditions for interfacial polymerization can vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of BPA, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary aspect, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be about 0.1 to about 10 wt % based on the weight of bisphenol in the phosgenation mixture. In another aspect, an effective amount of phase transfer catalyst can be about 0.5 to about 2 wt % based on the weight of bisphenol in the phosgenation mixture.

All types of polycarbonate end groups are contemplated as being useful in the polycarbonate composition, provided that such end groups do not significantly adversely affect desired properties of the thermoplastic compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

In some aspects, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer can become very high upon addition of the branching agent, and to avoid excess viscosity during polymerization, an increased amount of a chain stopper agent can be used, relative to the amount used when the particular branching agent is not present. The amount of chain stopper used is generally above 5 mole percent and less than 20 mole percent compared to the bisphenol monomer.

Such branching agents include aromatic triacyl halides, for example triacyl chlorides of formula (9):

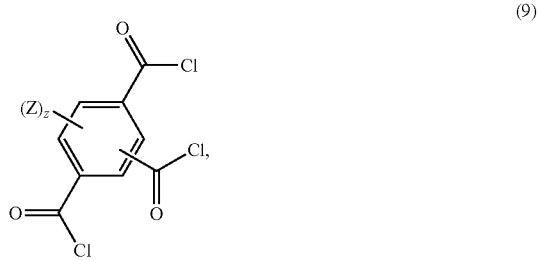

(9)

wherein Z is a halogen, $C_{1-3}$ alkyl, $C_{1-3}$ alkoxy, $C_{7-12}$ arylalkylene, $C_{7-12}$ alkylarylene, or nitro, and z is 0 to 3; a tri-substituted phenol of formula (10)

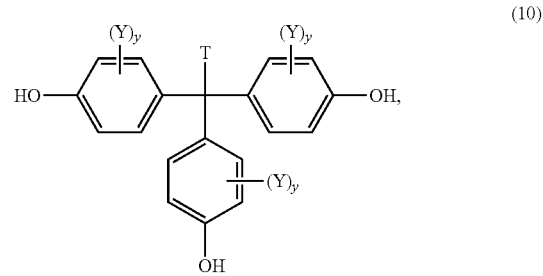

(10)

wherein T is a $C_{1-20}$ alkyl, $C_{1-20}$ alkyleneoxy, $C_{7-12}$ arylalkyl, or $C_{7-12}$ alkylaryl, Y is a halogen, $C_{1-3}$ alkyl, $C_{1-3}$ alkoxy, $C_{7-12}$ arylalkyl, $C_{7-12}$ alkylaryl, or nitro, y is 0 to 4; or a compound of formula (11) (isatin-bis-phenol):

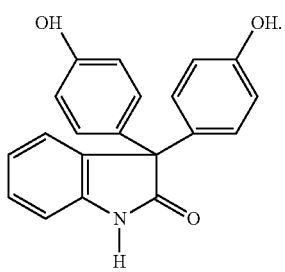

(11)

Examples of specific branching agents that are particularly effective in the thermoplastic compositions include trimellitic trichloride (TMTC), tris-p-hydroxyphenylethane (THPE), and isatin-bis-phenol.

The amount of the branching agents used in the manufacture of the polymer will depend on a number of considerations, for example the type of $R^1$ groups, the amount of chain stopper, e.g., cyanophenol, and the desired molecular weight of the polycarbonate. In general, the amount of branching agent is effective to provide 0.1 to 10 branching units per 100 $R^1$ units, specifically 0.5 to 8 branching units per 100 $R^1$ units, and more specifically 0.75 to 5 branching units per 100 $R^1$ units. For branching agents having formula (9), the branching agent triester groups are present in an amount of 0.1 to 10 branching units per 100 $R^1$ units, specifically 0.5 to 8 branching units per 100 $R^1$ units, and more specifically 0.75 to 5 branching agent triester units per 100 $R^1$ units. For branching agents having formula (10) or (11), the branching agent triphenyl carbonate groups formed are present in an amount of 0.1 to 10 branching units per 100 $R^1$ units, specifically 0.5 to 8 branching units per 100 $R^1$ units, and more specifically 0.75 to 5 triphenylcarbonate units per 100 $R^1$ units. In some aspects, a combination of two or more branching agents can be used. Alternatively, the branching agents can be added at a level of 0.05 to 2.0 wt %.

In various aspects, the polycarbonate is a branched polycarbonate comprising units as described above; greater than or equal to 3 mole %, based on the total moles of the polycarbonate, of moieties derived from a branching agent; and end-capping groups derived from an end-capping agent having a pKa between 8.3 and 11. The branching agent can comprise trimellitic trichloride, 1,1,1-tris(4-hydroxyphenyl) ethane or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, halogens, ester groups, ether groups, or a combination comprising at least one of the foregoing. In a specific aspect, the end-capping agent is phenol, p-t-butylphenol, p-methoxyphenol, p-cyanophenol, p-cumylphenol, or a combination comprising at least one of the foregoing.

In a further aspect, the polycarbonate component comprises at least one branched polycarbonate. In a still further aspect, the branched polycarbonate component has a weight average molecular weight from about 35,000 to about 45,000 grams/mole, as measured by GPC using BPA polycarbonate standards. In yet a further aspect, the branched polycarbonate component has a weight average molecular weight from about 35,000 to about 40,000 grams/mole, as measured by GPC using BPA polycarbonate standards. In an even further aspect, the branched polycarbonate component has a weight average molecular weight from about 40,000 to about 45,000 grams/mole, as measured by GPC using BPA polycarbonate standards.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, monocarboxylic acid chlorides, and/or monochloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Specifically, polyester-polycarbonates, including poly(aliphatic ester)-polycarbonates, can be prepared by interfacial polymerization. Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly(arylate ester)-polycarbonates), it is possible to employ isophthaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative can be condensed with the dihydroxyaromatic compound in a first condensation, followed by in situ phosgenation to generate the carbonate linkages with the dihydroxyaromatic compound. Alternatively, the dicarboxylic acid or derivative can be condensed with the dihydroxyaromatic compound simultaneously with phosgenation.

In an aspect, where the MVR of an otherwise compositionally suitable poly(aliphatic ester)-polycarbonate is not suitably high, i.e., where the MVR is less than 13 cc/10 min when measured at 250° C., under a load of 1.2 kg, the poly(aliphatic ester)-polycarbonate can be modified to provide a reaction product with a higher flow (i.e., greater than or equal to 13 cc/10 min when measured at 250° C., under a load of 1.2 kg), by treatment using a redistribution catalyst under conditions of reactive extrusion. During reactive extrusion, the redistribution catalyst is typically included in small amounts of less than or equal to 400 ppm by weight, by injecting a dilute aqueous solution of the redistribution catalyst into the extruder being fed with the poly(aliphatic ester)-polycarbonate.

In a further aspect, the redistribution-catalyst is a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination comprising at least one of the foregoing catalysts, wherein each alkyl is independently a $C_{1-6}$ alkyl. In a specific aspect, a useful redistribution catalyst is a tetra $C_{1-6}$ alkylphosphonium hydroxide, $C_{1-6}$ alkyl phosphonium phenoxide, or a combination comprising one or more of the foregoing catalysts. An exemplary redistribution catalyst is tetra-n-butylphosphonium hydroxide.

In a further aspect, the redistribution catalyst is present in an amount of 40 to 120 ppm, specifically 40 to 110 ppm, and more specifically 40 to 100 ppm, by weight based on the weight of the poly(aliphatic ester)-polycarbonate.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (12):

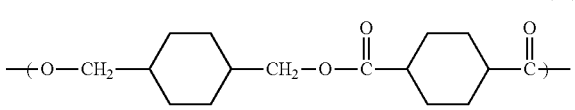

(12)

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the thermoplastic composition.

Polyester-polycarbonate copolymers generally can have a weight average molecular weight (Mw) of 1,500 to 100,000 g/mol, specifically 1,700 to 50,000 g/mol. In an aspect, poly(aliphatic ester)-polycarbonates have a weight average molecular weight of 15,000 to 45,000 g/mol, specifically 17,000 to 40,000 g/mol, more specifically 20,000 to 30,000 g/mol, and still more specifically 20,000 to 25,000 g/mol. Weight average molecular weight determinations are performed using GPC, using a crosslinked styrene-divinylbenzene column and calibrated to polycarbonate references. Samples are prepared at a concentration of about 1 mg/ml, and are eluted at a flow rate of about 1.0 ml/min.

As used herein, the term polycarbonate-polysiloxane copolymer is equivalent to polysiloxane-polycarbonate copolymer, polycarbonate-polysiloxane polymer, or polysiloxane-polycarbonate polymer. In various aspects, the polycarbonate-polysiloxane copolymer can be a block copolymer comprising one or more polycarbonate blocks and one or more polysiloxane blocks. The polysiloxane-polycarbonate copolymer comprises polydiorganosiloxane blocks comprising structural units of the general formula (13) below:

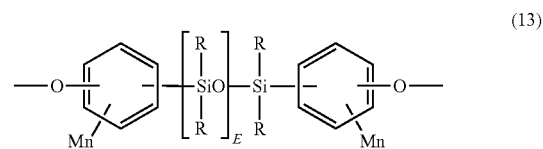

(13)

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (14) below:

(14)

wherein at least 60 percent of the total number of $R^1$ groups comprise aromatic moieties and the balance thereof comprise aliphatic, alicyclic, or aromatic moieties.

According to exemplary non-limiting aspects of the disclosure, the polycarbonate-polysiloxane block copolymer comprises diorganopolysiloxane blocks of the general formula (15) below:

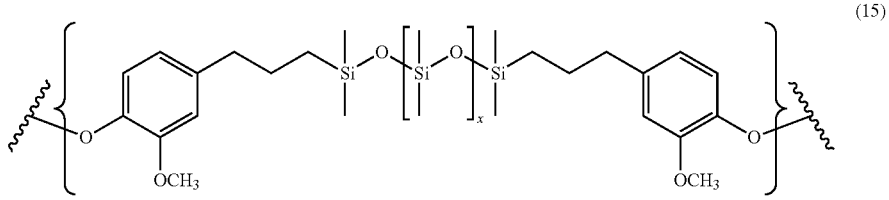

(15)

wherein x represents an integer from about 20 to about 60. The polycarbonate blocks according to these aspects can be derived from BPA monomers.

Diorganopolysiloxane blocks of formula (15) above can be derived from the corresponding dihydroxy compound of formula (16):

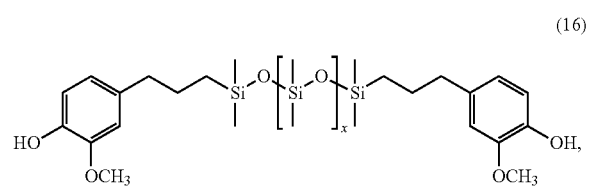

(16)

wherein x is as described above. Compounds of this type and others are further described in U.S. Pat. No. 4,746,701 to Kress, et al and U.S. Pat. No. 8,017,697 to Carrillo. Compounds of this formula can be obtained by the reaction of the appropriate dihydroxyarylene compound with, for example, an alpha, omega-bisacetoxypolydiorangonosiloxane under phase transfer conditions.

Such dihydroxy polysiloxanes can be made by effecting a platinum catalyzed addition between a siloxane hydride of the formula (17):

(17)

wherein x is a previously defined, and an aliphatically unsaturated monohydric phenol such as eugenol to yield a compound of formula (16).

The polycarbonate-polysiloxane copolymer can be manufactured by reaction of a diphenolic polysiloxane, such as that depicted by formula (16), with a carbonate source and a dihydroxy aromatic compound such as BPA, optionally in the presence of a phase transfer catalyst as described above. Suitable conditions are similar to those useful in forming polycarbonates. For example, the copolymers can be prepared by phosgenation at temperatures from below 0° C. to about 100° C., including for example, at temperatures from about 25° C. to about 50° C. Since the reaction is exothermic, the rate of phosgene addition can be used to control the reaction temperature. The amount of phosgene required will generally depend upon the amount of the dihydric reactants. Alternatively, the polycarbonate-polysiloxane copolymers can be prepared by co-reacting, in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy diorganopolysiloxane can be selected so as to provide the desired amount of diorganopolysiloxane units in the copolymer. The particular amounts used will therefore be determined depending on desired physical properties of the thermoplastic composition, the value of x (for example, within the range of about 20 to about 60), and the type and relative amount of each component in the thermoplastic composition, including the type and amount of polycarbonate, type and amount of polycarbonate-polysiloxane copolymer, and type and amount of any other additives. Suitable amounts of dihydroxy diorganopolysiloxane can be determined by one of ordinary skill in the art without undue experimentation using the guidelines taught herein.

For example, according to aspects of the disclosure, the polysiloxane-polycarbonate block copolymer can be provided having any desired level of siloxane content. For example, the siloxane content can be in the range of from 4 mole % to 20 mole %. In additional aspects, the siloxane content of the polysiloxane-polycarbonate block copolymer can be in the range of from 4 mole % to 10 mole %. In still further aspects, the siloxane content of the polysiloxane-polycarbonate block copolymer can be in the range of from 4 mole % to 8 mole %. In a further aspect, the polysiloxane-polycarbonate copolymer comprises a diorganosiloxane content in the range of from 5 to 7 mole wt %. In an even further exemplary aspect, the siloxane content of the polysiloxane-polycarbonate block copolymer can be about 6 mole %. Still further, the diorganopolysiloxane blocks can be randomly distributed in the polysiloxane-polycarbonate block copolymer.

In one aspect, the amount of dihydroxy diorganopolysiloxane can be selected so as to produce a copolymer comprising about 1 wt % to about 75 wt %, or about 1 wt % to about 50 wt % polydimethylsiloxane, or an equivalent molar amount of another polydiorganosiloxane. In one aspect, the copolymer comprises about 5 wt % to about 40 wt %, or about 5 wt % to about 25 wt % polydimethylsiloxane, or an equivalent molar amount of another polydiorganosiloxane, with the balance being polycarbonate. In another aspect, the copolymer can comprise about 20 wt % siloxane.

The disclosed polysiloxane-polycarbonate block copolymers can also be end-capped as similarly described in connection with the manufacture of polycarbonates set forth herein. For example, according to aspects of the disclosure, a polysiloxane-polycarbonate block copolymer can be end capped with p-cumyl-phenol.

In one aspect and without limitation, the polycarbonate-polysiloxane copolymers can have a weight average molecular weight, Mw of about 10,000 g/mol to about 200,000 g/mol, or about 20,000 g/mol to about 100,000 g/mol.

Useful polycarbonate-polysiloxane copolymers are commercially available and include, but are not limited to, those marketed under the trade name LEXAN™ EXL polymers, and are available from SABIC Innovative Plastics (formerly GE Plastics), including blends of LEXAN™ EXL polymers with different properties.

In various aspects, the polycarbonate component comprises at least one polycarbonate polymer, wherein the polycarbonate polymer can be a homopolymer, a copolymer, or combinations thereof. In a further aspect, the polycarbonate component comprises two or more polycarbonate polymers. In a still further aspect, the polycarbonate component comprises three or more polycarbonate polymers. In a yet further aspect, the polycarbonate component is a blend of at least two polycarbonate polymers.

In a further aspect, the polycarbonate component is a homopolymer. In a still further aspect, the polycarbonate component is a homopolymer comprising repeating units derived from BPA.

In a further aspect, the polycarbonate component is a copolymer. In a still further aspect, the polycarbonate component is a copolymer comprising repeating units derived from BPA. In yet a further aspect, the polycarbonate component is a copolymer comprising repeating units derived from sebacic acid. In an even further aspect, the polycarbonate component is a copolymer comprising repeating units derived from sebacic acid and BPA.

In a further aspect, the polycarbonate has a weight average molecular weight from about 15,000 to about 50,000 grams/mole, as measured by GPC using BPA polycarbonate standards. In a still further aspect, the polycarbonate has a weight average molecular weight from about 15,000 to about 40,000 grams/mole, as measured by GPC using BPA polycarbonate standards. In yet a further aspect, the polycarbonate has a weight average molecular weight from about 17,000 to about 50,000 grams/mole, as measured by GPC using BPA polycarbonate standards. In an even further aspect, the polycarbonate has a weight average molecular weight from about 17,000 to about 40,000 grams/mole, as measured by GPC using BPA polycarbonate standards.

In a further aspect, the polycarbonate component comprises a copolymer.

In a further aspect, the polycarbonate component comprises a blend of at least two polycarbonate polymers.

In a further aspect, the polycarbonate component comprises at least one optical quality (OQ) polycarbonate component. In a still further aspect, the OQ polycarbonate component has a weight average molecular weight from about 15,000 to about 18,000 grams/mole, as measured by gel permeation using BPA polycarbonate standards. In yet a further aspect, the OQ polycarbonate component has a weight average molecular weight from about 15,000 to about 17,000 grams/mole, as measured by gel permeation using BPA polycarbonate standards. In an even further aspect, the OQ polycarbonate component has a weight average molecular weight from about 15,000 to about 16,000 grams/mole, as measured by gel permeation using BPA polycarbonate standards. In a still further aspect, the OQ polycarbonate component has a weight average molecular weight from about 16,000 to about 18,000 grams/mole, as measured by gel permeation using BPA polycarbonate standards. In yet a further aspect, the OQ polycarbonate component has a weight average molecular weight from about 17,000 to about 18,000 grams/mole, as measured by gel permeation using BPA polycarbonate standards.

In a further aspect, the polycarbonate component comprises at least one low flow polycarbonate component. In a still further aspect, the low flow polycarbonate component has an MVR of at least about 3.0 $cm^3/10$ minutes when measured at 300° C. and under a load of 1.2 kg according to ASTM D1238. In yet a further aspect, the low flow polycarbonate component has an MVR of at least about 4.0 $cm^3/10$ minutes when measured at 300° C. and under a load of 1.2 kg according to ASTM D1238. In an even further aspect, the low flow polycarbonate component has an MVR of at least about 4.5 $cm^3/10$ minutes when measured at 300° C. and under a load of 1.2 kg according to ASTM D1238. In a still further aspect, the low flow polycarbonate component has an MVR of at least about 5.0 $cm^3/10$ minutes when measured at 300° C. and under a load of 1.2 kg according to ASTM D1238. In yet a further aspect, the low flow polycarbonate component has an MVR from about 4.0 $cm^3/10$ minutes to about 8.0 $cm^3/10$ minutes when measured at 300° C. and under a load of 1.2 kg according to ASTM D1238. In an even further aspect, the low flow polycarbonate component has an MVR from about 4.5 $cm^3/10$ minutes to about 7.2 $cm^3/10$ minutes when measured at 300° C. and under a load of 1.2 kg according to ASTM D1238. In a still further aspect, the low flow polycarbonate component has an MVR from about 4.8 $cm^3/10$ minutes to about 7.1 $cm^3/10$ minutes when measured at 300° C. and under a load of 1.2 kg according to ASTM D1238.

In a further aspect the low flow polycarbonate component has a weight average molecular weight from about 20,000 to about 40,000 grams/mole, as measured by GPC using BPA polycarbonate standards. In a still further aspect the low flow polycarbonate component has a weight average molecular weight from about 20,000 to about 35,000 grams/mole, as measured by GPC using BPA polycarbonate standards. In yet a further aspect the low flow polycarbonate component has a weight average molecular weight from about 20,000 to about 30,000 grams/mole, as measured by GPC using BPA polycarbonate standards. In an even further aspect the low flow polycarbonate component has a weight average molecular weight from about 23,000 to about 30,000 grams/mole, as measured by GPC using BPA polycarbonate standards. In a still further aspect the low flow polycarbonate component has a weight average molecular weight from about 25,000 to about 30,000 grams/mole, as measured by GPC using BPA polycarbonate standards. In yet a further aspect the low flow polycarbonate component has a weight average molecular weight from about 27,000 to about 30,000 grams/mole, as measured by GPC using BPA polycarbonate standards.

In one aspect, the first polycarbonate can be present in any effective amount to form the thermoplastic composition having a better mold release performance compared to a substantially identical reference composition in the absence of the mold release composition, and wherein the presence of the mold release composition has substantially no impact on the mechanical and physical properties. In one aspect, the first polycarbonate is present in amount from about 10 wt % to about 80 wt % including exemplary amounts of about 15 wt %, 20 wt %, 25 wt %, 30 wt %, 35 wt %, 40 wt %, 45 wt %, 50 wt %, 55 wt %, 60 wt %, 65 wt %, 70 wt %, and about 75 wt %. In still further aspects, the first polycarbonate can be present in any range derived from any two values set forth above.

In one aspect, the second polycarbonate is present in amount from about 10 wt % to about 80 wt %, including exemplary amounts of about 15 wt %, 20 wt %, 25 wt %, 30 wt %, 35 wt %, 40 wt %, 45 wt %, 50 wt %, 55 wt %, 60 wt %, 65 wt %, 70 wt %, and about 75 wt %. In still further aspects, the second polycarbonate can be present in any range derived from any two values set forth above.

In one aspect, the third polycarbonate component can be present in amount from greater than 0 wt % to about 15 wt %, including exemplary amounts of 0.01 wt %, 0.1 wt %, 0.5 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, and 14 wt %. In a further aspect, the third polycarbonate component can be present in an amount in any range derived from any two values set forth above. For example, the third polycarbonate component can be present in an amount in the range of from about 0.1 wt % to about 10 wt %, from about 1 wt % to about 7 wt %, or from about 3 wt % to about 7 wt %.

B. Impact Modifiers

In a further aspect, the disclosed blended thermoplastic compositions of the present invention comprise one or more impact modifier components, or two or more impact modifiers. Suitable impact modifiers are typically high weight average molecular weight elastomeric materials derived from olefins, monovinyl aromatic monomers, acrylic and methacrylic acids, and their derivatives, as well as conjugated dienes. The elastomeric materials can be in the form of homopolymers or copolymers, including random, block, radial block, graft and core-shell polymers. Combinations of impact modifiers can also be used. In one aspect, the impact modifiers do not catalyze hydrolytic degradation of polycarbonates.

In a further aspect, the impact modifier component comprises at least one ABS polymer component, at least one MBS polymer component, at least one BABS polymer component, at least one SAN component, or combinations thereof. In a still further aspect, the impact modifier component comprises at least one ABS polymer component, at least one MBS polymer component, at least one BABS polymer component, or combinations thereof.

ABS graft copolymers contain two or more polymeric parts of different compositions, which are bonded chemically. The graft copolymer is specifically prepared by first polymerizing a conjugated diene, such as butadiene or another conjugated diene, with a monomer copolymerizable therewith, such as styrene, to provide a polymeric backbone. After formation of the polymeric backbone, at least one grafting monomer, and specifically two, are polymerized in the presence of the polymer backbone to obtain the graft copolymer. These resins are prepared by methods well known in the art.

For example, ABS can be made by one or more of emulsion or solution polymerization processes, bulk/mass, suspension and/or emulsion-suspension process routes. In addition, ABS materials can be produced by other process techniques such as batch, semi batch and continuous polymerization for reasons of either manufacturing economics or product performance or both. In order to reduce point defects or inclusions in the inner layer of the final multi-layer article, the ABS is produced by bulk polymerized.

Emulsion polymerization of vinyl monomers gives rise to a family of addition polymers. In many instances the vinyl emulsion polymers are copolymers containing both rubbery and rigid polymer units. Mixtures of emulsion resins, especially mixtures of rubber and rigid vinyl emulsion derived polymers are useful in blends.

Such rubber modified thermoplastic resins made by an emulsion polymerization process can comprise a discontinuous rubber phase dispersed in a continuous rigid thermoplastic phase, wherein at least a portion of the rigid thermoplastic phase is chemically grafted to the rubber phase. Such a rubbery emulsion polymerized resin can be further blended with a vinyl polymer made by an emulsion or bulk polymerized process. However, at least a portion of the vinyl polymer, rubber or rigid thermoplastic phase, blended with polycarbonate, will be made by emulsion polymerization.

Suitable rubbers for use in making a vinyl emulsion polymer blend are rubbery polymers having a Tg of less than or equal to 25° C., or preferably less than or equal to 10° C., more preferably less than or equal to 0° C., and even more preferably less than or equal to −30° C. As referred to herein, the Tg of a polymer is the Tg value of polymer as measured by differential scanning calorimetry (heating rate 20° C./minute, with the Tg value being determined at the inflection point). In another aspect, the rubber comprises a linear polymer having structural units derived from one or more conjugated diene monomers. Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene and dibromobutadiene as well as mixtures of conjugated diene monomers. In a preferred aspect, the conjugated diene monomer is 1,3-butadiene.

The emulsion polymer can, optionally, include structural units derived from one or more copolymerizable monoethylenically unsaturated monomers selected from ($C_2$-$C_{12}$) olefin monomers, vinyl aromatic monomers and monoethylenically unsaturated nitrile monomers and ($C_2$-$C_{12}$) alkyl (meth)acrylate monomers. As used herein, the term "($C_2$-$C_{12}$) olefin monomers" means a compound having from 2 to 12 carbon atoms per molecule and having a single site of ethylenic unsaturation per molecule. Suitable ($C_2$-$C_{12}$) olefin monomers include, e.g., ethylene, propene, 1-butene, 1-pentene, heptene, 2-ethyl-hexylene, 2-ethyl-heptene, 1-octene, and 1-nonene. As used herein, the term "($C_1$-$C_{12}$) alkyl" means a straight or branched alkyl substituent group having from 1 to 12 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl and dodecyl, and the terminology "(meth)acrylate monomers" refers collectively to acrylate monomers and methacrylate monomers.

The rubber phase and the rigid thermoplastic phase of the emulsion modified vinyl polymer can, optionally include structural units derived from one or more other copolymerizable monoethylenically unsaturated monomers such as, e.g., monoethylenically unsaturated carboxylic acids such as, e.g., acrylic acid, methacrylic acid, itaconic acid, hydroxy ($C_1$-$C_{12}$) alkyl (meth)acrylate monomers such as, e.g., hydroxyethyl methacrylate; ($C_5$-$C_{12}$) cycloalkyl (meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "($C_5$-$C_{12}$) cycloalkyl" means a cyclic alkyl substituent group having from 5 to 12 carbon atoms per group and the term "(meth)acrylamide" refers collectively to acrylamides and methacrylamides.

In some cases the rubber phase of the emulsion polymer is derived from polymerization of a butadiene, $C_4$-$C_{12}$ acrylates or combinations thereof with a rigid phase derived from polymerization of styrene, $C_1$-$C_3$ acrylates, methacrylates, acrylonitrile or combinations thereof where at least a portion of the rigid phase is grafted to the rubber phase. In other instances more than half of the rigid phase will be grafted to the rubber phase.

Suitable vinyl aromatic monomers include, e.g., styrene and substituted styrenes having one or more alkyl, alkoxyl, hydroxyl or halo substituent group attached to the aromatic ring, including, e.g., -methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers. As used herein, the term "monoethylenically unsaturated nitrile monomer" means an acyclic compound that includes a single nitrile group and a single site of ethylenic unsaturation per molecule and includes, e.g., acrylonitrile, methacrylonitrile, a-chloro acrylonitrile.

In an alternative aspect, the rubber is a copolymer, preferably a block copolymer, comprising structural units derived from one or more conjugated diene monomers and up to 90 percent by weight ("wt %") structural units derived from one or more monomers selected from vinyl aromatic monomers and monoethylenically unsaturated nitrile monomers, such as, a styrene-butadiene copolymer, an acrylonitrile-butadiene copolymer or a styrene-butadiene-acrylonitrile copolymer. In another aspect, the rubber is a styrene-butadiene block copolymer that contains from 50 to 95 wt % structural units derived from butadiene and from 5 to 50 wt % structural units derived from styrene.

The emulsion derived polymers can be further blended with non-emulsion polymerized vinyl polymers, such as those made with bulk or mass polymerization techniques. A process to prepare mixtures containing polycarbonate, an emulsion derived vinyl polymer, along with a bulk polymerized vinyl polymers, is also contemplated.

The rubber phase can be made by aqueous emulsion polymerization in the presence of a radical initiator, a surfactant and, optionally, a chain transfer agent and coagulated to form particles of rubber phase material. Suitable initiators include conventional free radical initiator such as, e.g., an organic peroxide compound, such as e.g., benzoyl peroxide, a persulfate compound, such as, e.g., potassium persulfate, an azonitrile compound such as, e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate. Suitable chain transfer agents include, for example, a ($C_9$-$C_{13}$) alkyl mercaptan compound such as nonyl mercaptan, t-dodecyl mercaptan. Suitable emulsion aids include, linear or branched carboxylic acid salts, with about 10 to 30 carbon atoms. Suitable salts include ammonium carboxylates and alkaline carboxylates; such as ammonium stearate, methyl ammonium behenate, triethyl ammonium stearate, sodium stearate, sodium iso-stearate, potassium stearate, sodium salts of tallow fatty acids, sodium oleate, sodium palmitate, potassium linoleate, sodium laurate, potassium abieate (rosin acid salt), sodium abietate and combinations thereof. Often mixtures of fatty acid salts derived from natural sources such as seed oils or animal fat (such as tallow fatty acids) are used as emulsifiers.

In various aspects, the emulsion polymerized particles of rubber phase material have a weight average particle size of about 50 to about 800 nanometers ("nm"), as measured by light transmission. In a further aspect, the emulsion polymerized particles of rubber phase material have a weight average particle size of from about 100 to about 500 nm, as measured by light transmission. The size of emulsion polymerized rubber particles can optionally be increased by mechanical, colloidal or chemical agglomeration of the emulsion polymerized particles, according to known techniques.

The rigid thermoplastic phase comprises one or more vinyl derived thermoplastic polymers and exhibits a Tg of greater than 15° C., greater than 25° C., preferably greater than or equal to 90° C. and even more preferably greater than or equal to 100° C.

In various aspects, the rigid thermoplastic phase comprises a vinyl aromatic polymer having first structural units derived from one or more vinyl aromatic monomers, preferably styrene, and having second structural units derived from one or more monoethylenically unsaturated nitrile monomers.

The amount of grafting that takes place between the rigid thermoplastic phase and the rubber phase can vary with the relative amount and composition of the rubber phase. In one aspect, from 10 to 90 wt %, often from 25 to 60 wt %, of the rigid thermoplastic phase is chemically grafted to the rubber phase and from 10 to 90 wt %, preferably from 40 to 75 wt % of the rigid thermoplastic phase remains "free", i.e., non-grafted.

The rigid thermoplastic phase of the rubber modified thermoplastic resin can be formed solely by emulsion polymerization carried out in the presence of the rubber phase or by addition of one or more separately polymerized rigid thermoplastic polymers to a rigid thermoplastic polymer that has been polymerized in the presence of the rubber phase. In various aspects, the weight average molecular weight of the one or more separately polymerized rigid thermoplastic polymers is from about 50,000 to about 100,000 g/mol. In a further aspect, the weight average molecular weight of the one or more separately polymerized rigid thermoplastic polymers is from about 75,000 to about 150,000 g/mol. In a still further aspect, the weight average molecular weight of the one or more separately polymerized rigid thermoplastic polymers is from about 100,000 to about 135,000 g/mol.

In other cases, the rubber modified thermoplastic resin comprises a rubber phase having a polymer with structural units derived from one or more conjugated diene monomers, and, optionally, further comprising structural units derived from one or more monomers selected from vinyl aromatic monomers and monoethylenically unsaturated nitrile monomers, and the rigid thermoplastic phase comprises a polymer having structural units derived from one or more monomers selected from vinyl aromatic monomers and monoethylenically unsaturated nitrile monomers. In one aspect, the rubber phase of the rubber modified thermoplastic resin comprises a polybutadiene or poly(styrene-butadiene) rubber and the rigid thermoplastic phase comprises a SAN copolymer. Vinyl polymers free of alkyl carbon-halogen linkages, specifically bromine and chlorine carbon bond linkages can provide melt stability.

In some instances it is desirable to isolate the emulsion vinyl polymer or copolymer by coagulation in acid. In such instances the emulsion polymer can be contaminated by residual acid, or species derived from the action of such acid, for example carboxylic acids derived from fatty acid soaps used to form the emulsion. The acid used for coagulation can be a mineral acid; such as sulfuric acid, hydrochloric acid, nitric acid, phosphoric acid or mixtures thereof. In some cases the acid used for coagulation has a pH less than about 5.

In a further aspect, the ABS copolymer is a BABS. BABS is an elastomeric phase comprising one or more unsaturated monomers, such as butadiene having a Tg of less than or equal to 10° C., and a polymeric graft phase (e.g., rigid graft phase) comprising a copolymer of one or more monovinylaromatic monomers such as styrene and one or more unsaturated nitrile monomers, such as acrylonitrile having a Tg greater than 50° C. Rigid generally means a Tg greater than room temperature, e.g., a Tg greater than about 21° C. Such BABS can be prepared by first providing the elastomeric polymer, then polymerizing the constituent monomers of the rigid graft phase in the presence of the elastomer to obtain the elastomer modified copolymer. As the rigid graft phase copolymer molecular weight increases, a phase inversion occurs in which some of the rigid graft phase copolymer will be entrained within the elastomeric phase. Some of the grafts can be attached as graft branches to the elastomer phase.

The term "polyolefin elastomer polymer" means polyolefin resins which are polymerized with an olefin monomer such as propylene, ethylene or butene and can be selected according to the required performance of a product such as heat resistance, flexibility and transparency. The polyolefin elastomer polymer can be used alone or in admixture of a plurality of polyolefin resins in consideration of their crystallinity, noncrystallinity and elasticity. Examples of polyolefin resins include polypropylene homopolymers such as isotactic polypropylene, syndiotactic polypropylene and atactic polypropylene, polyethylene resins, propylene α-olefin copolymers or ethylene α-olefin copolymers having at least one α-olefin monomer such as ethylene, propylene, butene, pentene, hexene, heptene, octene or 4-methylpentene-1, ethylene vinylacetate copolymers, ethylene vinylalcohol copolymers, ethylene acrylic acid copolymers, cyclic polyolefin resins such as those made from pentadiene and/or derivatives, and the like. In various aspects, the polyolefins used include conventional low density polyethylene (LDPE) made under high pressure; LDPE copolymers incorporating other α-olefins polyethylene/vinyl acetate copolymers; linear low density polyethylenes (LLDPE), which include copolymers of ethylene with one or more of propylene, butene, hexene, 4-methyl pentene-1, octene-1, and other unsaturated aliphatic hydrocarbons. In one aspect, the α-olefins are propylene, butene-1, hexene-1,4-methylpentene-1 and octene-1.

Substantially linear ethylene polymer or one or more linear ethylene polymer (S/LEP), or a mixture thereof, are useful as the impact modifier component in the disclosed blended thermoplastic compositions. Both substantially linear ethylene polymers and linear ethylene polymers are known. Substantially linear ethylene polymers and their method of preparation are fully described in U.S. Pat. Nos. 5,272,236 and 5,278,272. Linear ethylene polymers and their method of preparation are fully disclosed in U.S. Pat. Nos. 3,645,992; 4,937,299; 4,701,432; 4,937,301; 4,935,397; and 5,055,438; European Patent Nos. 129,368 and 260,999; and WO 90/07526. For example, such polymers are available commercially under the trade names ENGAGE™ polyolefin elastomers and AFFINITY™ polyolefin plastomers from The Dow Chemical Company, EXACT™ polyolefin elastomers from ExxonMobil, and TAFMER™ polyolefin elastomers from Mitsui.

Suitable polyolefin elastomer polymers of the S/LEP type comprise one or more $C_2$ to $C_{20}$ alpha-olefins in polymerized form and having a Tg less than about 25° C. In a further aspect, suitable polyolefin elastomer polymers of the S/LEP type comprise one or more $C_2$ to $C_{20}$ alpha-olefins in polymerized form and having a Tg less than about 0° C. In a still further aspect, suitable polyolefin elastomer polymers of the S/LEP type comprise one or more $C_2$ to $C_{20}$ alpha-olefins in polymerized form and having a Tg less than about −25° C. Examples of the types of polymers from which the present S/LEP can be selected include copolymers of alpha-olefins, such as ethylene and propylene, ethylene and 1-butene, ethylene and 1-hexene or ethylene and 1-octene copolymers, and terpolymers of ethylene, propylene and a diene comonomer such as hexadiene or ethylidene norbornene.

In a further aspect, the impact modifier component comprises an ABS polymer component. In a still further aspect, the ABS polymer component is a BABS. In a still further aspect, the ABS polymer component is a SAN-grafted emulsion ABS.

In a further aspect, the polybutadiene content of the ABS polymer component is about 10 wt % to about 70 wt % based on the weight of the ABS polymer component. In a still further aspect, the polybutadiene content of the ABS polymer component is about 20 wt % to about 65 wt % based on the weight of the ABS polymer component. In a yet further aspect, the polybutadiene content of the ABS polymer component is about 50 wt % to about 70 wt % based on the weight of the ABS polymer component.

In one aspect, the thermoplastic composition comprise an impact modifier composition present in an amount from about 1 wt % to about 30 wt %, including exemplary amounts of about 2 wt %, 3 wt %, 4 wt %, 5 wt %, 6 wt %, 7 wt %, 8 wt %, 9 wt %, 10 wt %, 11 wt %, 12 wt %, 13 wt %, 14, wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, and about 29 wt %. In still further aspects, the impact modifiers can be present in any range derived from any two values set forth above.

In a further aspect, the impact modifier component is present in an amount from about 1 wt % to about 10 wt %. In a still further aspect, the impact modifier component is present in an amount from about 1 wt % to about 9 wt %. In a yet further aspect, the impact modifier component is present in an amount from about 1 wt % to about 8 wt %. In an even further aspect, the impact modifier component is present in an amount from about 1 wt % to about 7 wt %. In a still further aspect, the impact modifier component is present in an amount from about 1 wt % to about 6 wt %. In a yet further aspect, the impact modifier component is present in an amount from about 1 wt % to about 5 wt %.

In a further aspect, the impact modifier component is present in an amount from about 2 wt % to about 10 wt %. In a still further aspect, the impact modifier component is present in an amount from about 2 wt % to about 9 wt %. In a yet further aspect, the impact modifier component is present in an amount from about 2 wt % to about 8 wt %. In an even further aspect, the impact modifier component is present in an amount from about 2 wt % to about 7 wt %. In a still further aspect, the impact modifier component is present in an amount from about 2 wt % to about 6 wt %. In a yet further aspect, the impact modifier component is present in an amount from about 2 wt % to about 5 wt %.

The thermoplastic composition further comprises an ungrafted rigid copolymer, in addition to (or separate from) any free ungrafted rigid copolymer that can be present from one or more of the impact modifiers. For example, there can be some 'free' SAN present from the BABS. In some aspects, the rigid copolymer is an aromatic vinyl copolymer. The rigid copolymer is additional to any rigid copolymer present in the impact modifier. It can be the same as any of the rigid copolymers described above, without the elastomer modification. The rigid copolymers generally have a Tg greater than about 15° C., specifically greater than about 20° C., and include, for example, polymers derived from monovinylaromatic monomers containing condensed aromatic ring structures, such as vinyl naphthalene, vinyl anthracene and the like, or monomers of formula (9) as broadly described above, for example styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl(meth)acrylates, and monomers of the general formula (10) as broadly described above, for example acrylonitrile, methyl acrylate and methyl methacrylate; and copolymers of the foregoing, for example SAN, styrene-alpha-methyl SAN, methyl methacrylate-acrylonitrile-styrene, and methyl methacrylate-styrene.

The rigid copolymer can comprise about 1 to about 99 wt %, specifically about 20 to about 95 wt %, more specifically about 40 to about 90 wt % of vinylaromatic monomer, together with 1 to about 99 wt %, specifically about 5 to about 80 wt %, more specifically about 10 to about 60 wt % of copolymerizable monovinylic monomers. In one aspect the rigid copolymer is SAN, which can comprise about 50 to about 99 wt % styrene, with the balance acrylonitrile, specifically about 60 to about 90 wt % styrene, and more specifically about 65 to about 85 wt % styrene, with the remainder acrylonitrile.

The rigid copolymer can be manufactured by bulk, suspension, or emulsion polymerization, and is substantially free of impurities, residual acids, residual bases or residual metals that can catalyze the hydrolysis of polycarbonate. In one aspect, the rigid copolymer is manufactured by bulk polymerization using a boiling reactor. The rigid copolymer can have a weight average molecular weight of about 50,000 to about 300,000 as measured by GPC using polystyrene standards. In one aspect, the weight average molecular weight of the rigid copolymer is about 50,000 to about 200,000. In an aspect, the ungrafted rigid copolymer is SAN.

C. Mold Release Composition

In one aspect, the thermoplastic composition further comprises a combination of mold release additives. There is considerable overlap among additives such as plasticizers, lubricants, and/or mold release agents, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of BPA; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; block copolymers of polyethylene oxide and polypropylene oxide, such as the Pluronic™ family of copolymers; waxes such as beeswax, montan wax, paraffin wax and the like; and poly alpha olefins such as Ethylflo™ 164, 166, 168, and 170.

In one aspect, exemplary mold releasing additives include for example without limitation, metal stearate, stearyl stearate, pentaerythritol tetrastearate, beeswax, montan wax, paraffin wax, or the like, or combinations including at least one of the foregoing mold release additives. Mold releasing additives are generally used in amounts of from 0.1 to 1.0 parts by weight, based on 100 parts by weight of the total composition, excluding any filler.

In one aspect, the mold release composition comprises at least two mold release additives comprising PETS, GMS, glycerol tristearate, poly(alfa) olefin, poly(ethylene oxide-propylene oxide-ethylene oxide), or any combination thereof.

In one aspect, the thermoplastic composition comprises a mold release composition comprising at least two different mold release additives. In one aspect the mold release composition is present in an amount in the range from about 0.001 parts by weight to about 1.5 parts by weight added to the 100 parts by weight of the thermoplastic composition excluding the mold release composition. In a further aspect, the mold release composition is present in exemplary amounts of about 0.005 parts by weight, 0.01 parts by weight, 0.02 parts by weight, 0.03 parts by weight, 0.04 parts by weight, 0.05 parts by weight, 0.06 parts by weight, 0.07 parts by weight, 0.08 parts by weight, 0.09 parts by weight, 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1.0 parts by weight, 1.1 parts by weight, 1.2 parts by weight, 1.3 parts by weight, and about 1.4 parts by weight added to the 100 parts by weight of the thermoplastic composition excluding the mold release composition. In still further aspect, the mold release composition can be present in any range derived from the above values. For example, the mold release composition can be present in the thermoplastic composition in an amount in the range from about 0.005 parts per weight to about 1.5 parts per weight, or even from about 0.01 parts per weight to about 0.5 parts per weight added to the 100 parts by weight of the thermoplastic composition excluding the mold release composition.

In one aspect, the mold release additives in the mold release composition can be present in any relative weight ratio. In another aspect, In one aspect, the weight ratio of at least two mold release additives present in the mold release composition can be in the range from about 1:1 to about 10:1, including exemplary values of 2:1, 3:1, 4:1, 5:1, 6:1, 7:1, 8:1, and 9:1. In still further aspect, at least two mold release additives can be present in the mold release composition in any weight ratio derived from the above values.

In further aspects, the at least two different mold release additives comprise PETS in an amount higher than a second one of the at least two mold release additives.

In one aspect, the thermoplastic composition comprising the mold release composition has better mold release performance compared to a substantially identical reference composition in the absence of the mold release composition, and wherein the presence of the mold release composition has substantially no impact on the mechanical and physical properties.

In one aspect, the thermoplastic composition comprising the mold release composition has lower ejection pressure compared to a substantially identical reference composition in the absence of the mold release composition, and wherein the presence of the mold release composition has substantially no impact on the mechanical and physical properties.

The relative amount of each component of the thermoplastic composition will depend on the particular type of polycarbonate(s) used, the presence of any other resins, and the particular impact modifier(s), including any optional rigid graft copolymer, as well as the desired properties of the thermoplastic composition. Particular amounts can be readily selected by one of ordinary skill in the art using the guidance provided herein.

D. Optional Polymer Composition Additives

The disclosed thermoplastic composition can optionally comprise one or more additives conventionally used in the manufacture of molded polymer parts with the proviso that the optional additives do not adversely affect the desired properties of the resulting composition. Mixtures of optional additives can also be used. Such additives can be mixed at a suitable time during the mixing of the components for forming the composite mixture. For example, the disclosed composition can comprise one or more fillers, plasticizers, stabilizers, anti-static agents, flame-retardants, impact modifiers, colorant, antioxidant, and/or mold release agents. In one aspect, the thermoplastic composition further comprises one or more optional additives selected from an antioxidant, impact modifier, flame retardant, inorganic filler, and stabilizer.

Suitable fillers or reinforcing agents that can be used include, for example, silicates and silica powders such as aluminum silicate (mullite), synthetic calcium silicate, zirconium silicate, fused silica, crystalline silica graphite, natural silica sand, and the like; boron powders such as boron-nitride powder, boron-silicate powders, and the like; oxides such as $TiO_2$, aluminum oxide, magnesium oxide, and the like; calcium sulfate (as its anhydride, dihydrate or trihydrate); calcium carbonates such as chalk, limestone, marble, synthetic precipitated calcium carbonates, and the like; talc, including fibrous, modular, needle shaped, lamellar talc, and the like; wollastonite; surface-treated wollastonite; glass spheres such as hollow and solid glass spheres, silicate spheres, cenospheres, aluminosilicate (armospheres), and the like; kaolin, including hard kaolin, soft kaolin, calcined kaolin, kaolin comprising various coatings known in the art to facilitate compatibility with the polymeric matrix resin, and the like; single crystal fibers or "whiskers" such as silicon carbide, alumina, boron carbide, iron, nickel, copper, and the like; fibers (including continuous and chopped fibers) such as asbestos, carbon fibers, glass fibers, such as E, A, C, ECR, R, S, D, or NE glasses, and the like; sulfides such as molybdenum sulfide, zinc sulfide and the like; barium species such as barium titanate, barium ferrite, barium sulfate, heavy spar, and the like; metals and metal oxides such as particulate or fibrous aluminum, bronze, zinc, copper and nickel and the like; flaked fillers such as glass flakes, flaked silicon carbide, aluminum diboride, aluminum flakes, steel flakes and the like; fibrous fillers, for example short inorganic fibers such as those derived from blends comprising at least one of aluminum silicates, aluminum oxides, magnesium oxides, and calcium sulfate hemihydrate and the like; natural fillers and reinforcements, such as wood flour obtained by pulverizing wood, fibrous products such as cellulose, cotton, sisal, jute, starch, cork flour, lignin, ground nut shells, corn, rice grain husks and the like; organic fillers such as polytetrafluoroethylene (Teflon™) and the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, polyvinyl alcohol) and the like; as well as additional fillers and reinforcing agents such as mica, clay, feldspar, flue dust, fillite, quartz, quartzite, perlite, tripoli, diatomaceous earth, carbon black, and the like, and combinations comprising at least one of the foregoing fillers and reinforcing agents. The fillers/reinforcing agents can be coated to prevent reactions with the matrix or can be chemically passivated to neutralize catalytic degradation site that might promote hydrolytic or thermal degradation.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber and the like. Fibrous fillers can be supplied in the form of, for example, rovings, woven fibrous reinforcements, such as 0-90 degree fabrics and the like; non-woven fibrous reinforcements such as continuous strand mat, chopped strand mat, tissues, papers and felts and the like; or three-dimensional reinforcements such as braids. Fillers are generally used in amounts of about 0 to about 150 parts by weight, based on 100 parts by weight of the thermoplastic composition.

Exemplary heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Suitable secondary heat stabilizer additives include, for example thioesters and thioesters such as pentaerythritol tetrakis(3-(dodecylthio)propionate), pentaerythritol tetrakis[3-(3,5-di-tert-butyl-4-hydroxyphenyl)propionate], dilauryl thiodipropionate, distearyl thiodipropionate, dimyristyl thiodipropionate, ditridecyl thiodipropionate, pentaerythritol octylthiopropionate, dioctadecyl disulphide, and the like, and combinations comprising at least one of the foregoing heat stabilizers. Secondary stabilizers are generally used in amount of about 0.01 to about 5, specifically about 0.03 to about 0.3 parts by weight, based upon 100 parts by weight of the total composition, excluding any filler.

Exemplary antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Exemplary light stabilizers include, for example, benzotriazoles and hydroxybenzotriazoles such as 2-(2-hydroxy-5-methylphenyl)benzotriazole, 2-(2-hydroxy-5-tert-octylphenyl)-benzotriazole, 2-(2H-benzotriazol-2-yl)-4-(1,1,3,3-tetramethylbutyl)-phenol (CYASORB™ 5411 from Cytec), and TINUVIN™ 234 from Ciba Specialty Chemicals; hydroxybenzotriazines; hydroxyphenyl-triazine or -pyrimidine UV absorbers such as TINUVIN™ 1577 (Ciba), and 2-[4,6-bis(2,4-dimethylphenyl)-1,3,5-triazin-2-yl]-5-(octyloxy)-phenol (CYASORB™ 1164 from Cytec); non-basic hindered amine light stabilizers (hereinafter "HALS"), including substituted piperidine moieties and oligomers thereof, for example 4-piperidinol derivatives such as TINUVIN™ 622 (Ciba), GR-3034, TINUVIN™ 123, and TINUVIN™ 440; benzoxazinones, such as 2,2'-(1,4-phenylene)bis(4H-3,1-benzoxazin-4-one) (CYASORB™ UV-3638); hydroxybenzophenones such as 2-hydroxy-4-n-octyloxybenzophenone (CYASORB™ 531); oxanilides; cyanoacrylates such as 1,3-bis[(2-cyano-3,3-diphenylacryloyl)oxy]-2,2-bis[[(2-cyano-3,3-diphenylacryloyl)oxy]methyl]propane (UVINUL™ 3030) and 1,3-bis[(2-cyano-3,3-diphenylacryloyl)oxy]-2,2-bis[[(2-cyano-3,3-diphenylacryloyl)oxy]methyl]propane; and nano-size inorganic materials such as titanium oxide, cerium oxide, and zinc oxide, all with particle size less than about 100 nanometers; and the like, and combinations comprising at least one of the foregoing stabilizers.

Light stabilizers are generally used in amounts of from 0.1 to 1.0 parts by weight, based on 100 parts by weight of the total composition, excluding any filler. UV absorbers are generally used in amounts of about 0.1 to about 5 parts by weight, based on 100 parts by weight of the total composition, excluding any filler.

Exemplary plasticizers include, for example, phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Exemplary antistatic agents include, for example, GMS, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the thermoplastic composition electrostatically dissipative.

Combinations of the foregoing antistatic agents can be used. Exemplary polymeric antistatic agents include certain polyetheresters, each containing polyalkylene glycol moieties such as polyethylene glycol, polypropylene glycol, polytetramethylene glycol, and the like. Such polymeric antistatic agents are commercially available, and include, for example PELESTAT™ 6321 (Sanyo), PEBAX™ MH1657 (Atofina), and IRGASTAT™ P18 and P22 (Ciba-Geigy). Other polymeric materials that can be used as antistatic agents are inherently conducting polymers such as polythiophene (commercially available from Bayer), which retains some of its intrinsic conductivity after melt processing at elevated temperatures. In one aspect, carbon fibers, carbon nanofibers, carbon nanotubes, carbon black or any combination of the foregoing can be used in a polymeric resin containing chemical antistatic agents to render the thermoplastic composition electrostatically dissipative. Antistatic agents are generally used in amounts of about 0.1 to about 10 parts by weight, specifically about based on 100 parts by weight of the thermoplastic composition.

Colorants such as pigment and/or dye additives can also be present. Suitable pigments include for example, inorganic pigments such as metal oxides and mixed metal oxides such as zinc oxide, titanium dioxides, iron oxides and the like; sulfides such as zinc sulfides, and the like; aluminates; sodium sulfo-silicates sulfates, chromates, and the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, and combinations comprising at least one of the foregoing pigments. Pigments can be coated to prevent reactions with the matrix or can be chemically passivated to neutralize catalytic degradation site that might promote hydrolytic or thermal degradation. Pigments are generally used in amounts of about 0.01 to about 10 parts by weight, based on 100 parts by weight of the thermoplastic composition.

Suitable dyes are generally organic materials and include, for example, coumarin dyes such as coumarin 460 (blue), coumarin 6 (green), nile red and the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene; triarylmethane dyes; xanthene dyes; thioxanthene dyes; naphthalimide dyes; lactone dyes; fluorophores such as anti-stokes shift dyes which absorb in the near infrared wavelength and emit in the visible wavelength, and the like; luminescent dyes such as 5-amino-9-diethyliminobenzo(a)phenoxazonium perchlorate; 7-amino-4-methylcarbostyryl; 7-amino-4-methylcoumarin; 7-amino-4-trifluoromethylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenylyl)-5-phenyl-1,3,4-oxadiazole; 2-(4-biphenyl)-6-phenylbenzoxazole-1,3; 2,5-bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 1,1'-diethyl-4,4'-carbocyanine iodide; 3,3'-diethyl-4,4',5,5'-dibenzothiatricarbocyanine iodide; 1,1'-diethyl-4,4'-dicarbocyanine iodide; 1,1'-diethyl-2,2'-dicarbocyanine iodide; 3,3'-diethyl-9,11-neopentylenethiatricarbocyanine iodide; 1,3'-diethyl-4,2'-quinolyloxacarbocyanine iodide; 1,3'-diethyl-4,2'-quinolylthiacarbocyanine iodide; 3-diethylamino-7-diethyliminophenoxazonium perchlorate; 7-diethylamino-4-methylcoumarin; 7-diethylamino-4-trifluoromethylcoumarin; 7-diethylaminocoumarin; 3,3'-diethyloxadicarbocyanine iodide; 3,3'-diethylthiacarbocyanine iodide; 3,3'-diethylthiadicarbocyanine iodide; 3,3'- diethylthiatricarbocyanine iodide; 4,6-dimethyl-7-ethylaminocoumarin; 2,2'-dimethyl-p-quaterphenyl; 2,2-dimethyl-p-terphenyl; 7-dimethylamino-1-methyl-4-methoxy-8-aza-quinolone-2; 7-dimethylamino-4-methylquinolone-2; 7-dimethylamino-4-trifluoromethylcoumarin; 2-(4-(4-dimethylaminophenyl)-1,3-butadienyl)-3-ethylbenzothiazolium perchlorate; 2-(6-(p-dimethylaminophenyl)-2,4-neopentylene-1,3,5-hexatrienyl)-3-methylbenzothiazolium perchlorate; 2-(4-(p-dimethylaminophenyl)-1,3-butadienyl)-1,3,3-trimethyl-3H-indolium perchlorate; 3,3'-dimethyloxatricarbocyanine iodide; 2,5-diphenylfuran; 2,5-diphenyloxazole; 4,4'-diphenylstilbene; 1-ethyl-4-(4-(p-dimethylaminophenyl)-1,3-butadienyl)-pyridinium perchlorate; 1-ethyl-2-(4-(p-dimethylaminophenyl)-1,3-butadienyl)-pyridinium perchlorate; 1-ethyl-4-(4-(p-dimethylaminophenyl)-1,3-butadienyl)-quinolium perchlorate; 3-ethylamino-7-ethylimino-2,8-dimethylphenoxazin-5-ium perchlorate; 9-ethylamino-5-ethylamino-10-methyl-5H-benzo(a)phenoxazonium perchlorate; 7-ethylamino-6-methyl-4-trifluoromethylcoumarin; 7-ethylamino-4-trifluoromethylcoumarin; 1,1',3,3,3',3'-hexamethyl-4,4',5,5'-dibenzo-2,2'-indotricarboccyanine iodide; 1,1',3,3,3',3'-hexamethylindodicarbocyanine iodide; 1,1',3,3,3',3'-hexamethylindotricarbocyanine iodide; 2-methyl-5-t-butyl-p-quaterphenyl; N-methyl-4-trifluoromethylpiperidino-<3, 2-g>coumarin; 3-(2'-N-methylbenzimidazolyl)-7-N,N-diethylaminocoumarin; 2-(1-naphthyl)-5-phenyloxazole; 2,2'-p-phenylen-bis(5-phenyloxazole); 3,5,3"",5""-tetra-t-butyl-p-sexiphenyl; 3,5,3''',5""-tetra-t-butyl-p-quinquephenyl; 2,3,5,6-1H,4H-tetrahydro-9-acetylquinolizino-<9,9a,1-gh>coumarin; 2,3,5,6-1H,4H-tetrahydro-9-carboethoxyquinolizino-<9,9a,1-gh>coumarin; 2,3,5,6-1H,4H-tetrahydro-8-methylquinolizino-<9,9a,1-gh>coumarin; 2,3,5,6-1H,4H-tetrahydro-9-(3-pyridyl)-quinolizino-<9,9a,1-gh>coumarin; 2,3,5,6-1H,4H-tetrahydro-8-trifluoromethylquinolizino-<9,9a,1-gh>coumarin; 2,3,5,6-1H,4H-tetrahydroquinolizino-<9,9a,1-gh>coumarin; 3,3',2",3"'-tetramethyl-p-quaterphenyl; 2,5,2"",5"'-tetramethyl-p-quinquephenyl; P-terphenyl; P-quaterphenyl; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene and the like, and combinations comprising at least one of the foregoing dyes. Dyes are generally used in amounts of about 0.1 parts per million to about 10 parts by weight, based on 100 parts by weight of the thermoplastic composition.

Exemplary lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Where a foam is desired, suitable blowing agents can be added. Exemplary blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties can be added to the thermoplastic composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

In another aspect, the disclosed thermoplastic composition is capable of being molded into an article.

II. METHODS OF MANUFACTURE

In various aspects, the thermoplastic compositions of the present invention can be manufactured by various methods. The thermoplastic compositions of the present invention can be blended, compounded, or otherwise combined with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods includes, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the melt processed composition exits processing equipment such as an extruder through small exit holes in a die. The resulting strands of molten resin are cooled by passing the strands through a water bath. The cooled strands can be chopped into small pellets for packaging and further handling.

In one aspect, the invention relates to a method of forming the disclosed thermoplastic compositions. The methods generally comprise: (a) providing: (i) a first polycarbonate in an amount in the range from about 10 wt % to about 80 wt %; (ii) an impact modifier composition in an amount in the range from about 1 wt % to about 30 wt %; (b) mixing all components to create a mixture that does not exceed 100 wt %, and wherein all weight percent value are based on the total weight of the thermoplastic composition; (c) blending a mold release composition in an amount in the range from about 0.01 parts by weight to about 1.5 parts by weight into 100 parts of the mixture excluding the mold release composition to form a thermoplastic composition, and wherein one or more of the at least two different mold release additives comprises PETS, GMS, glycerol tristearate, poly (alfa) olefin, poly(ethylene oxide-propylene oxide-ethylene oxide), or any combination thereof. In one aspect, a molded sample of the thermoplastic composition has better mold release performance compared to a substantially identical reference composition in the absence of the mold release composition, and wherein the presence of the mold release composition has substantially no impact on the mechanical and physical properties. In another aspect, the method further comprises a step (d) extruding the thermoplastic composition.

In one aspect, disclosed herein the method for making the thermoplastic composition, wherein the at least two different mold release additives comprise PETS in an amount higher than a second one of the at least two mold release additives. In yet another aspect, the mold release composition comprises at least two of the mold release additives that are present in the weight ratio in the range from about 10:1 to about 1:1.

In further aspects, disclosed herein the method of making the thermoplastic composition, wherein the molded sample of the thermoplastic composition has lower ejection pressure compared to a substantially identical reference composition in the absence of the mold release composition, and wherein the presence of the mold release composition has substantially no impact on the mechanical and physical properties In yet another aspect, disclosed herein is a method for making a thermoplastic composition comprising steps: (a) providing: (i) a first polycarbonate in an amount in the range from about 10 wt % to about 40 wt %; (ii) a second polycarbonate in an amount in the range from about 20 wt % to about 60 wt %; (iii) an impact modifier composition in an amount in the range from about 1 wt % to about 30 wt %; (iv) a third polycarbonate composition comprising a polycarbonate-polysiloxane copolymer in an amount in the range from greater than 0 to about 10 wt %; (b) mixing all components to create a mixture that does not exceed 100 wt %, and wherein all weight percent value are based on the total weight of the thermoplastic composition; (c) blending a mold release composition in an amount in the range from about 0.01 parts by weight to about 1.5 parts by weight into 100 parts of the mixture excluding the mold release composition to form a thermoplastic composition wherein at least two of the mold release additives are in the weight ratio in the range of greater than 1:1 to about 10:1. Still further, and according to this aspect, the presence of the mold release composition has better mold release performance compared to a substantially identical reference composition in the absence of the mold release composition, and wherein the presence of the mold release composition has substantially no impact on the mechanical and physical properties. In another aspect, the method of making the thermoplastic composition can further comprise a step (d) of extruding the thermoplastic composition.

III. ARTICLES OF MANUFACTURE

A shaped, formed, or molded article including the thermoplastic composition is also provided. The polymer composition can be molded into useful shaped articles by a variety of means such as injection molding, extrusion, rotational molding, blow molding and thermoforming, foaming to form articles such as, for example, useful in mass transportation industry. In one aspect, the article comprises textiles, mattresses, seats, exterior and interior materials used in a transportation industry. The exemplary articles formed according to the aspects describe herein comprise materials used for example and without limitations in automotive interior trims, appliques, mirror housings, wheel covers, fenders, bumpers, spoilers, or instrument panels.

IV. ASPECTS

The disclosed thermoplastic compositions, methods of manufacturing the thermoplastic compositions and articles of manufacture include at least the following aspects:

Aspect 1: A thermoplastic composition comprising:
(a) from about 10 wt % to about 80 wt % of a first polycarbonate;
(b) an impact modifier composition from about 1 wt % to about 30 wt %,
wherein the combined weight percent of components (a) through (b) does not exceed 100 wt %, wherein all weight percent values are based on the total weight of the thermoplastic composition; and
(c) a mold release composition comprising at least two different mold release additives from about 0.01 parts by weight to about 1.5 parts by weight added to 100 parts by weight of the thermoplastic composition excluding the mold release composition, wherein one or more of the at least two different mold release additives comprises pentaerithritol tetrastearate, glycerol monostearate, glycerol tristearate, poly(alfa) olefin, poly(ethylene oxide-propylene oxide-ethylene oxide), or any combination thereof; and
wherein a molded sample of the thermoplastic composition has better mold release performance compared to a substantially identical reference composition in the absence of the mold release composition, and wherein the presence of the mold release composition has substantially no impact on the mechanical and physical properties.

Aspect 2: The thermoplastic composition of Aspect 1, wherein the at least two different mold release additives comprise pentaerithritol tetrastearate in an amount higher than a second one of the at least two mold release additives.

Aspect 3: The thermoplastic composition of any one of Aspect 1-2, wherein the mold release composition comprises at least two of the mold release additives that are present in the weight ratio in the range from about 10:1 to about 1:1.

Aspect 4: The thermoplastic composition of any one of Aspects 1-3, wherein the molded sample of the thermoplastic composition has lower ejection pressure compared to a substantially identical reference composition in the absence of the mold release composition, and wherein the presence of the mold release composition has substantially no impact on the mechanical and physical properties.

Aspect 5: The thermoplastic composition of any one of Aspects 1-4, further comprising a second polycarbonate in an amount in the range from about 10 wt % to about 80 wt %.

Aspect 6: The thermoplastic composition of any one of Aspects 1-5, further comprising a third polycarbonate component in an amount in the range from greater than 0 wt % to about 15 wt %.

Aspect 7: The thermoplastic composition of any one of Aspects 1-6, wherein the third polycarbonate comprises a polycarbonate-polysiloxane copolymer.

Aspect 8: The thermoplastic composition of any one of Aspects 1-7, further comprising a stabilizer composition in an amount in the range from greater than 0 wt % to about 1.5 wt %.

Aspect 9: The thermoplastic composition of any one of Aspects 1-8, wherein the stabilizer composition comprises one or more of heat stabilizers, UV stabilizers, or a combination thereof.

Aspect 10: The thermoplastic composition of any one of Aspects 1-9, wherein the first polycarbonate has a weight average molecular weight in the range from about 18,000 to about 34,000.

Aspect 11: The thermoplastic composition of any one of Aspects 1-10, wherein the first polycarbonate has a weight average molecular weight of about 21,900 Daltons.

Aspect 12: The thermoplastic composition of any one of Aspects 5-11, wherein the second polycarbonate has a weight average molecular weight in the range from about 18,000 to about 34,000.

Aspect 13: The thermoplastic composition of any one of Aspects 5-12, wherein the second polycarbonate has a weight average molecular weight of about 29,900 Daltons.

Aspect 14: The thermoplastic composition of any one of Aspects 1-13, wherein the first polycarbonate comprises 2,2-bis(4-hydroxyphenyl)propane polycarbonate.

Aspect 15: The thermoplastic composition of any one of Aspects 5-14, wherein the second polycarbonate comprises 2,2-bis(4-hydroxyphenyl)propane polycarbonate that is different from the first polycarbonate.

Aspect 16: The thermoplastic composition of any one of Aspects 1-15, wherein the impact modifier composition comprises one or more of an acrylonitrile-butadiene-styrene polymer component, a methyl methacrylate-butadiene-styrene polymer component, a bulk polymerized acrylonitrile-butadiene-styrene polymer, a styrene-acrylonitrile copolymer, a styrene acrylonitrile grafted acrylonitrile-butadiene-styrene component, or any combination thereof.

Aspect 17: The thermoplastic composition of any one of Aspects 1-16, wherein the impact modifier composition comprises one or more of the styrene acrylonitrile grafted acrylonitrile-butadiene-styrene component, the methyl methacrylate butadiene styrene component, or the styrene-acrylonitrile copolymer.

Aspect 18: The thermoplastic composition of any one of Aspects 1-17, wherein a butadiene content in the styrene acrylonitrile grafted acrylonitrile-butadiene-styrene component is in the range from about 10 wt % to about 70 wt %.

Aspect 19: The thermoplastic composition of any one of Aspects 1-18, wherein the butadiene content is at least about 16 wt %.

Aspect 20: An article made from the thermoplastic composition of any one of Aspects 1-19.

Aspect 21: A thermoplastic composition comprising:
(a) from about 10 wt % to about 40 wt % of a first polycarbonate;
(b) from about 20 wt % to about 60 wt % of a second polycarbonate;
(c) an impact modifier composition from about 1 wt % to about 30 wt %;
(d) from greater than 0 to about 10 wt % of a third polycarbonate comprising a polycarbonate polysiloxane copolymer;
wherein the combined weight percent of components (a) through (d) does not exceed 100 wt %, wherein all weight percent values are based on the total weight of the thermoplastic composition; and
(e) a mold release composition comprising at least two different mold release additives from about 0.01 parts by weight to about 1.5 parts by weight added to 100 parts of the thermoplastic composition excluding the mold release composition, wherein at least two of the mold release additives are in the weight ratio in the range of greater than 1:1 to about 10:1; and
wherein a molded sample of the thermoplastic composition has better mold release performance compared to a substantially identical reference composition in the absence of the mold release composition, and wherein the presence of the mold release composition has substantially no impact on the mechanical and physical properties.

Aspect 22: The thermoplastic composition of Aspect 21, wherein one or more of the at least two different mold release additives comprises pentaerithritol tetrastearate, glycerol monostearate, glycerol tristearate, poly(alfa) olefin, poly(ethylene oxide-propylene oxide-ethylene oxide), or any combination thereof.

Aspect 23: The thermoplastic composition of any one of Aspects 21-22, wherein the at least two different mold release additives comprise pentaerithritol tetrastearate in an amount higher than a second one of the at least two mold release additives.

Aspect 24: The thermoplastic composition of any one of Aspects 21-23 further compromising a stabilizer composition in amount in the range from greater than 0 wt % to about 15 wt %.

Aspect 25: An article made from the thermoplastic composition of any one of Aspects 21-24.

Aspect 26: A method of making a thermoplastic composition comprising the steps:
(a) providing:
(i) a first polycarbonate in an amount in the range from about 10 wt % to about 80 wt %;
(ii) an impact modifier composition in an amount in the range from about 1 wt % to about 30 wt %;
(b) mixing all components to create a mixture that does not exceed 100 wt %, and wherein all weight percent value are based on the total weight of the thermoplastic composition;
(c) blending a mold release composition in an amount in the range from about 0.01 parts by weight to about 1.5 parts by weight into 100 parts of the mixture excluding the mold release composition to form a thermoplastic composition;
wherein one or more of the at least two different mold release additives comprises pentaerithritol tetrastearate, glycerol monostearate, glycerol tristearate, poly(alfa) olefin, poly(ethylene oxide-propylene oxide-ethylene oxide), or any combination thereof; and wherein a molded sample of the thermoplastic composition has better mold release performance compared to a substantially identical reference composition in the absence of the mold release composition, and wherein the presence of the mold release composition has substantially no impact on the mechanical and physical properties.

Aspect 27: The method of Aspect 26, further comprising providing a second polycarbonate in step (a) in an amount in the range from about 10 wt % to about 80 wt %.

Aspect 28: The method any one of Aspects 26-27, wherein the at least two different mold release additives comprise pentaerithritol tetrastearate in an amount higher than a second one of the at least two mold release additives.

Aspect 29: The method any one of Aspects 26-28, wherein the mold release composition comprises at least two of the mold release additives that are present in the weight ratio in the range from about 10:1 to about 1:1.

Aspect 30: The method any one of Aspects 26-29, wherein the molded sample of the thermoplastic composition has lower ejection pressure compared to a substantially identical reference composition in the absence of the mold release composition, and wherein the presence of the mold release composition has substantially no impact on the mechanical and physical properties.

Aspect 31: The method of any one of Aspects 26-30, further comprising step (d) extruding the thermoplastic composition.

Aspect 32: The method of any one of Aspects 26-31, further comprising providing a third polycarbonate component in step (a) in an amount in the range from greater than 0 wt % to about 15 wt %.

Aspect 33: The method of any one of Aspects 26-32, wherein the third polycarbonate comprises a polycarbonate-polysiloxane copolymer.

Aspect 34: The method of any one of Aspects 26-33, further providing a stabilizer composition in step (a) in an amount in the range from greater than 0 wt % to about 1.5 wt %.

Aspect 35: The method of any one of Aspects 26-34, wherein the stabilizer composition comprises one or more of heat stabilizers, UV stabilizers, or a combination thereof.

Aspect 36: A method of making a thermoplastic composition comprising the steps:
(a) providing:
  (i) a first polycarbonate in an amount in the range from about 10 wt % to about 40 wt %;
  (ii) a second polycarbonate in an amount in the range from about 20 wt % to about 60 wt %;
  (iii) an impact modifier composition in an amount in the range from about 1 wt % to about 30 wt %;
  (iv) a third polycarbonate composition comprising a polycarbonate-polysiloxane copolymer in an amount in the range from greater than 0 to about 10 wt %;
(b) mixing all components to create a mixture that does not exceed 100 wt %, and wherein all weight percent value are based on the total weight of the thermoplastic composition;
(c) blending a mold release composition in an amount in the range from about 0.01 parts by weight to about 1.5 parts by weight into 100 parts of the mixture excluding the mold release composition to form a thermoplastic composition;
  wherein at least two of the mold release additives are in the weight ratio in the range of greater than 1:1 to about 10:1; and
  wherein a molded sample of the thermoplastic composition has better mold release performance compared to a substantially identical reference composition in the absence of the mold release composition, and wherein the presence of the mold release composition has substantially no impact on the mechanical and physical properties.

Aspect 37: The method of Aspect 36 further comprising step (d) extruding the thermoplastic composition.

Aspect 38: The method of any one of Aspects 36-37, wherein one or more of the at least two different mold release additives comprises pentaerithritol tetrastearate, glycerol monostearate, glycerol tristearate, poly(alfa) olefin, poly(ethylene oxide-propylene oxide-ethylene oxide), or any combination thereof.

Aspect 39: The method of any one of Aspects 36-38, wherein the at least two different mold release additives comprise pentaerithritol tetrastearate in an amount higher than a second one of the at least two mold release additives.

Aspect 40: The method of any one of Aspects 36-39, wherein a molded sample of the thermoplastic composition has lower ejection pressure compared to a substantially identical reference composition in the absence of the mold release composition, and wherein the presence of the mold release composition has substantially no impact on the mechanical and physical properties.

Aspect 41: A thermoplastic composition comprising:
(a) from about 10 wt % to about 80 wt % of a first polycarbonate;
(b) an impact modifier composition from about 1 wt % to about 30 wt %;
  wherein the combined weight percent of components (a) through (b) does not exceed 100 wt %, wherein all weight percent values are based on the total weight of the thermoplastic composition; and
(c) a mold release composition comprising at least two different mold release additives from about 0.01 parts by weight to about 1.5 parts by weight added to 100 parts by weight of the thermoplastic composition excluding the mold release composition;
  and wherein a molded sample of the thermoplastic composition has better cracking performance compared to a substantially identical reference composition in the absence of the mold release composition, and wherein the presence of the mold release composition has substantially no impact on the mechanical and physical properties.

Aspect 42: The thermoplastic composition of Aspect 41, further comprising a second polycarbonate in an amount in the range from about 10 wt % to about 80 wt %.

Aspect 43: The thermoplastic composition of any one of Aspects 41-42, further comprising a third polycarbonate component in an amount in the range from greater than 0 wt % to about 15 wt %.

Aspect 44: The thermoplastic composition of any one of Aspects 41-43, wherein the third polycarbonate comprises a polycarbonate-polysiloxane copolymer.

Aspect 45: The thermoplastic composition of any one of Aspects 41-44, further comprising a stabilizer composition in an amount in the range from greater than 0 wt % to about 1.5 wt %.

Aspect 46: The thermoplastic composition of any one of Aspects 41-45, wherein the stabilizer composition comprises one or more of heat stabilizers, UV stabilizers, or a combination thereof.

Aspect 47: The thermoplastic composition of any one of Aspects 41-46, wherein the first polycarbonate has a weight average molecular weight in the range from about 18,000 Daltons to about 34,000 Daltons.

Aspect 48: The thermoplastic composition of any one of Aspects 41-47, wherein the first polycarbonate has a weight average molecular weight of about 21,900 Daltons.

Aspect 49: The thermoplastic composition of any one of Aspects 42-48, wherein the second polycarbonate has a weight average molecular weight in the range from about 18,000 Daltons to about 34,000 Daltons.

Aspect 50: The thermoplastic composition of any one of Aspects 42-49, wherein the second polycarbonate has a weight average molecular weight of about 29,900 Daltons.

Aspect 51: The thermoplastic composition of any one of Aspects 41-50, wherein the first polycarbonate comprises 2,2-bis(4-hydroxyphenyl)propane polycarbonate.

Aspect 52: The thermoplastic composition of any one of Aspects 42-51, wherein the second polycarbonate comprises 2,2-bis(4-hydroxyphenyl)propane polycarbonate that is different from the first polycarbonate.

Aspect 53: The thermoplastic composition of any one of Aspects 41-52, wherein the impact modifier composition comprises one or more of an acrylonitrile-butadiene-styrene polymer component, a methyl methacrylate-butadiene-styrene polymer component, a bulk polymerized acrylonitrile-butadiene-styrene polymer, a styrene-acrylonitrile copolymer, a styrene acrylonitrile grafted acrylonitrile-butadiene-styrene component, or any combination thereof.

Aspect 54: The thermoplastic composition of any one of Aspects 41-53, wherein the impact modifier composition comprises one or more of the styrene acrylonitrile grafted acrylonitrile-butadiene-styrene component, the methyl methacrylate butadiene styrene component, or the styrene-acrylonitrile copolymer.

Aspect 55: The thermoplastic composition of any one of Aspects 41-54, wherein a butadiene content in the styrene acrylonitrile grafted acrylonitrile-butadiene-styrene component is in the range from about 10 wt % to about 70 wt %.

Aspect 56: The thermoplastic composition of any one of Aspects 41-55, wherein the butadiene content is at least about 16 wt %.

Aspect 57: The thermoplastic composition of any one of Aspects 41-56, wherein one or more of the at least two different mold release additives comprises pentaerithritol tetrastearate, glycerol monostearate, glycerol tristearate, poly(alfa) olefin, poly(ethylene oxide-propylene oxide-ethylene oxide), or any combination thereof.

Aspect 58: The thermoplastic composition of any one of Aspects 41-57, wherein the mold release additives are present in the weight ratio in the range from about 10:1 to about 1:1.

Aspect 59: The thermoplastic composition of any one of Aspects 41-58, wherein a molded sample of the thermoplastic composition has lower ejection pressure compared to a substantially identical reference composition in the absence of the mold release composition, and wherein the presence of the mold release composition has substantially no impact on the mechanical and physical properties.

Aspect 60: An article made from the thermoplastic composition of any one of Aspects 41-59.

Aspect 61: A thermoplastic composition comprising:
(a) from about 10 wt % to about 40 wt % of a first polycarbonate;
(b) from about 20 wt % to about 60 wt % of a second polycarbonate;
(c) an impact modifier composition from about 1 wt % to about 30 wt %;
(d) from greater than 0 to about 10 wt % of a third polycarbonate comprising a polycarbonate polysiloxane copolymer;
wherein the combined weight percent of components (a) through (d) does not exceed 100 wt %, wherein all weight percent values are based on the total weight of the thermoplastic composition; and
(e) a mold release composition comprising at least two different mold release additives from about 0.01 parts by weight to about 1.5 parts by weight added to 100 parts of the thermoplastic composition excluding the mold release composition, wherein the mold release additives are in the weight ratio in the range between about 10:1 to about 1:1;
and wherein a molded sample of the thermoplastic composition has better cracking performance compared to a substantially identical reference composition in the absence of the mold release composition, and wherein the presence of the mold release composition has substantially no impact on the mechanical and physical properties.

Aspect 62: The thermoplastic composition of Aspect 61 further compromising a stabilizer composition in amount in the range from greater than 0 wt % to about 15 wt %.

Aspect 63: The thermoplastic composition of any one of Aspects 61-62, wherein the stabilizer composition comprises one or more of heat stabilizers, UV stabilizers, or a combination thereof.

Aspect 64: The thermoplastic composition of any one of Aspects 61-63, wherein the first polycarbonate has a weight average molecular weight in the range from about 18,000 Dalton to about 34,000 Daltons.

Aspect 65: The thermoplastic composition any one of Aspects 61-64, wherein the first polycarbonate has a weight average molecular weight of about 21,900 Daltons.

Aspect 66: The thermoplastic composition any one of Aspects 61-65, wherein the second polycarbonate has a weight average molecular weight in the range from about 18,000 Daltons to about 34,000 Daltons.

Aspect 67: The thermoplastic composition any one of Aspects 61-66, wherein the second polycarbonate has a weight average molecular weight of about 29,900 Daltons.

Aspect 68: The thermoplastic composition any one of Aspects 61-67, wherein the first polycarbonate comprises a 2,2-bis(4-hydroxyphenyl)propane polycarbonate.

Aspect 69: The thermoplastic composition any one of Aspects 61-68, wherein the second polycarbonate comprises a 2,2-bis(4-hydroxyphenyl)propane polycarbonate that is different from the first polycarbonate.

Aspect 70: The thermoplastic composition any one of Aspects 61-69, wherein the impact modifier composition comprises one or more of an acrylonitrile-butadiene-styrene polymer component, a methyl methacrylate-butadiene-styrene polymer component, a bulk polymerized acrylonitrile-butadiene-styrene polymer, a styrene-acrylonitrile copolymer, a styrene acrylonitrile grafted acrylonitrile-butadiene-styrene component, or any combination thereof.

Aspect 71: The thermoplastic composition any one of Aspects 61-70, wherein the impact modifier composition comprises one or more of the styrene acrylonitrile grafted acrylonitrile-butadiene-styrene component, the methyl methacrylate butadiene styrene component, or the styrene-acrylonitrile copolymer.

Aspect 72: The thermoplastic composition any one of Aspects 61-71, wherein a butadiene content in the styrene acrylonitrile grafted acrylonitrile-butadiene-styrene component is in the range from about 10 wt % to about 70 wt %.

Aspect 72: The thermoplastic composition any one of Aspects 61-71, wherein the butadiene content is at least 16 wt %.

Aspect 73: The thermoplastic composition any one of Aspects 61-72, wherein one or more of the at least two different mold release additives comprises pentaerithritol tetrastearate, glycerol monostearate, glycerol tristearate, poly(alfa) olefin, poly(ethylene oxide-propylene oxide-ethylene oxide), or any combination thereof.

Aspect 74: An article made from the thermoplastic composition of any one of Aspects 61-73.

Aspect 75: A method of making a thermoplastic composition comprising the steps:
(b) providing:
(i) a first polycarbonate in an amount in the range from about 10 wt % to about 80 wt %;
(ii) an impact modifier composition in an amount in the range from about 1 wt % to about 30 wt %;
(c) mixing all components to create a mixture that does not exceed 100 wt %, and wherein all weight percent value are based on the total weight of the thermoplastic composition;
(d) blending a mold release composition in an amount in the range from about 0.01 parts by weight to about 1.5 parts by weight into 100 parts of the mixture excluding the mold release composition to form a thermoplastic composition, wherein a molded sample of the thermoplastic composition has better cracking performance compared to a substantially identical reference composition in the absence of the mold release composition, and wherein the presence of the mold release composition has substantially no impact on the mechanical and physical properties.

Aspect 76: The method of Aspect 75, further comprising providing a second polycarbonate in step (a) in an amount in the range from about 10 wt % to about 80 wt %.

Aspect 77: The method of any one of Aspects 75-76, further comprising step (d) extruding the thermoplastic composition.

Aspect 78: The method any one of Aspects 75-77, further comprising providing a third polycarbonate component in step (a) in an amount in the range from greater than 0 wt % to about 15 wt %.

Aspect 79: The method any one of Aspects 75-78, wherein the third polycarbonate comprises a polycarbonate-polysiloxane copolymer.

Aspect 80: The method of any one of Aspects 75-79, further providing a stabilizer composition in step (a) in an amount in the range from greater than 0 wt % to about 1.5 wt %.

Aspect 81: The method of any one of Aspects 75-80, wherein the stabilizer composition comprises one or more of heat stabilizers, UV stabilizers, or a combination thereof.

Aspect 82: The method of any one of Aspects 75-81, wherein the first polycarbonate has a weight average molecular weight in the range from about 18,000 Daltons to about 34,000 Daltons.

Aspect 83: The method of any one of Aspects 75-82, wherein the first polycarbonate has a weight average molecular weight of about 21,900 Daltons.

Aspect 84: The method of any one of Aspects 76-83, wherein the second polycarbonate has a weight average molecular weight in the range from about 18,000 Daltons to about 34,000 Daltons.

Aspect 85: The method of any one of Aspects 76-84, wherein the second polycarbonate has a weight average molecular weight of about 29,900 Daltons.

Aspect 86: The method of any one of Aspects 75-85, wherein the first polycarbonate comprises 2,2-bis(4-hydroxyphenyl)propane polycarbonate.

Aspect 87: The method of any one of Aspects 76-86, wherein the second polycarbonate comprises 2,2-bis(4-hydroxyphenyl)propane polycarbonate that is different from the first polycarbonate.

Aspect 88: The method of any one of Aspects 75-87, wherein the impact modifier composition comprises one or more of an acrylonitrile-butadiene-styrene polymer component, a methyl methacrylate-butadiene-styrene polymer component, a bulk polymerized acrylonitrile-butadiene-styrene polymer, a styrene-acrylonitrile copolymer, a styrene acrylonitrile grafted acrylonitrile-butadiene-styrene component, or any combination thereof.

Aspect 89: The method of any one of Aspects 75-88, wherein the impact modifier composition comprises one or more of the styrene acrylonitrile grafted acrylonitrile-butadiene-styrene component, the methyl methacrylate butadiene styrene component, or the styrene-acrylonitrile copolymer.

Aspect 90: The method of any one of Aspects 75-89, wherein a butadiene content in the styrene acrylonitrile grafted acrylonitrile-butadiene-styrene component is in the range from about 10 wt % to about 70 wt %.

Aspect 91: The method of any one of Aspects 75-90, wherein the butadiene content is at least about 16 wt %.

Aspect 92: The method of any one of Aspects 75-91, wherein one or more of the at least two different mold release additives comprises pentaerythritol tetrastearate, glycerol monostearate, glycerol tristearate, poly(alfa) olefin, poly(ethylene oxide-propylene oxide-ethylene oxide), or any combination thereof.

Aspect 93: The method of any one of Aspects 75-92, wherein the mold release additives are present in the weight ratio in the range from about 10:1 to about 1:1.

Aspect 94: The method of any one of Aspects 75-93, wherein a molded sample of the thermoplastic composition has lower ejection pressure compared to a substantially identical reference composition in the absence of the mold release composition, and wherein the presence of the mold release composition has substantially no impact on the mechanical and physical properties.

Aspect 95: A method of making a thermoplastic composition comprising the steps:
(b) providing:
 (i) a first polycarbonate in an amount in the range from about 10 wt % to about 40 wt %;
 (ii) a second polycarbonate in an amount in the range from about 20 wt % to about 60 wt %;
 (iii) an impact modifier composition in an amount in the range from about 1 wt % to about 30 wt %;
 (iv) a third polycarbonate composition comprising a polycarbonate-polysiloxane copolymer in an amount in the range from greater than 0 to about 10 wt %;
(c) mixing all components to create a mixture that does not exceed 100 wt %, and wherein all weight percent value are based on the total weight of the thermoplastic composition;
(d) blending a mold release composition in an amount in the range from about 0.01 parts by weight to about 1.5 parts by weight into 100 parts of the mixture excluding the mold release composition to form a thermoplastic composition,
wherein a molded sample of the thermoplastic composition has better cracking performance compared to a substantially identical reference composition in the absence of the mold release composition, and wherein the presence of the mold release composition has substantially no impact on the mechanical and physical properties.

Aspect 96: The method of Aspect 95 further comprising step (d) extruding the thermoplastic composition.

Aspect 97: The method of any one of Aspects 95-96, further providing a stabilizer composition in step (a) in an amount in the range from greater than 0 wt % to about 1.5 wt %.

Aspect 98: The method of any one of Aspects 95-97, wherein the stabilizer composition comprises one or more of heat stabilizers, UV stabilizers, or a combination thereof.

Aspect 99: The method of any one of Aspects 95-98, wherein the first polycarbonate has a weight average molecular weight in the range from about 18,000 Daltons to about 34,000 Daltons.

Aspect 100: The method of any one of Aspects 95-99, wherein the first polycarbonate has a weight average molecular weight of about 21,900 Daltons.

Aspect 101: The method of any one of Aspects 95-100, wherein the second polycarbonate has a weight average molecular weight in the range from about 18,000 Daltons to about 34,000 Daltons.

Aspect 102: The method of any one of Aspects 95-101, wherein the second polycarbonate has a weight average molecular weight of about 29,900 Daltons.

Aspect 103: The method of any one of Aspects 95-102, wherein the first polycarbonate comprises 2,2-bis(4-hydroxyphenyl)propane polycarbonate.

Aspect 104: The method of any one of Aspects 95-103, wherein the second polycarbonate comprises 2,2-bis(4-hydroxyphenyl)propane polycarbonate that is different from the first polycarbonate.

Aspect 105: The method of any one of Aspects 95-104, wherein the impact modifier composition comprises one or more of an acrylonitrile-butadiene-styrene polymer component, a methyl methacrylate-butadiene-styrene polymer component, a bulk polymerized acrylonitrile-butadiene-styrene polymer, a styrene-acrylonitrile copolymer, a styrene acrylonitrile grafted acrylonitrile-butadiene-styrene component, or any combination thereof.

Aspect 106: The method of any one of Aspects 95-105, wherein the impact modifier composition comprises one or more of the styrene acrylonitrile grafted acrylonitrile-butadiene-styrene component, then methyl methacrylate butadiene styrene component, or the styrene-acrylonitrile copolymer.

Aspect 107: The method of any one of Aspects 95-106, wherein a butadiene content in the styrene acrylonitrile grafted acrylonitrile-butadiene-styrene component is in the range from about 10 wt % to about 70 wt %.

Aspect 108: The method of any one of Aspects 95-107, wherein the butadiene content is at least about 16 wt %.

Aspect 109: The method of any one of Aspects 95-108, wherein one or more of the at least two different mold release additives comprises pentaerithritol tetrastearate, glycerol monostearate, glycerol tristearate, poly(alfa) olefin, poly(ethylene oxide-propylene oxide-ethylene oxide), or any combination thereof.

Aspect 110: The method of any one of Aspects 95-109, wherein the mold release additives are present in the weight ratio in the range from about 10:1 to about 1:1.

Aspect 111: The method of any one of Aspects 95-110, wherein a molded sample of the thermoplastic composition has lower ejection pressure compared to a substantially identical reference composition in the absence of the mold release composition, and wherein the presence of the mold release composition has substantially no impact on the mechanical and physical properties.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

General Materials and Methods

Heat deflection temperature was determined per ISO 75 standard at 1.82 MPa and 3.2 mm, and is provided in units of ° C.

The NII test was carried out on 80 mm×10 mm×4 mm molded samples (bars) according to ISO 180 at 23° C. and −30° C. NII is reported in kJ/m$^2$ units. Ductility tests were performed at 23° C. and −30° C. Flexural properties (modulus and strength) were measured using 3.2 mm bars in accordance with ISO 178. Flexural strength (in units of MPa) and flexural modulus (in units of MPa) are reported at yield.

Ejection forces were measured using a variable draft angle injection molding tool. The ejection forces were measured in relative units.

MVR was determined in accordance with ASTM D1238 under the following test conditions: 260° C./5 kg/360 s and 260° C./5 kg/1080 s and is reported in units of cm$^3$/10 min.

Methods of Sample Preparation

The samples have been compounded in a 30 mm co-rotating Werner-Pfleiderer twin screw extruder. The pellets were dried at 80° C. for 4 hours prior to molding. Standard ISO test specimens were molded on a 120 Ton Demag injection molding machine.

Example 1

Table 1 describes the thermoplastic composition components. Table 2 describes the thermoplastic composition of inventive and comparative samples. Comparative samples C1-C5 and inventive samples E1-E4 were prepared based on the same resin composition, wherein various mold release additives were added to inventive samples E1-E4. Comparative sample C6 and inventive samples E5-E6 were prepared based on the same resin composition, wherein the amount of the mold release additives was varied to compare the effect of the mold release additives on mechanical and physical properties of the thermoplastic composition.

TABLE 1

| | | Thermoplastic composition Components | | |
|---|---|---|---|---|
| No. | Item | Description | Supplier | Trade name |
| 1 | PC1 | Polycarbonate homopolymer with Mw of 21,900 | SABIC | LEXAN™ |
| 2 | PC2 | Polycarbonate homopolymer with Mw of 29,900 | SABIC | LEXAN™ |
| 3 | PC3 | EXL polycarbonate copolymer | SABIC | LEXAN™-EXL |

TABLE 1-continued

Thermoplastic composition Components

| No. | Item | Description | Supplier | Trade name |
|---|---|---|---|---|
| 4 | ABS | SAN grafted emulsion ABS with butadiene content of ~16 wt % | SABIC | CYCOLAC |
| 5 | MBS | Methyl methacrylate butadiene styrene copolymer | | |
| 6 | SAN | Styrene-acrylonitrile copolymer | SABIC | |
| 7 | MR1 | Pentaerithritol tetrastearate | LONZA Spa | Glycolube P |
| 8 | MR2 | Glycerol monostearate | | |
| 9 | MR3 | Glycerol tristearate | | |
| 10 | MR4 | Poly(alpha) olefin | | |
| 11 | MR5 | Poly(ethylene oxide-propylene oxide-ethylene oxide) | BASF | Pluronic F88 |
| 12 | ST1 | Tris(2,4-di-t-butylphenyl)phospriite | CIBA | Irgafos 168 |
| 13 | ST2 | Pentaerythritol betalaurylthiopropionate | Haruno Sangyo Kaisha | Seenox 412S |
| 14 | ST3 | Octadecyl-3-(3,5, dietertbutyl-4-hydroyphenyl)propionate | CIBA/BASF | Irganox 1086 |

TABLE 2

Formulation details of comparative and inventive samples.

| | | C1 | C2 | C3 | C4 | C5 | E1 | E2 | E3 | E4 | C6 | E5 | E6 |
|---|---|---|---|---|---|---|---|---|---|---|---|---|---|
| PC1 | % | 35.82 | 35.82 | 35.82 | 35.82 | 35.82 | 35.82 | 35.82 | 35.82 | 35.82 | 14.4 | 14.4 | 14.4 |
| PC2 | % | 35.82 | 35.82 | 35.82 | 35.82 | 35.82 | 35.82 | 35.82 | 35.82 | 35.82 | 54.14 | 54.14 | 54.14 |
| PC3 | % | | | | | | | | | | 4.5 | 4.5 | 4.5 |
| ABS | % | 17.66 | 17.66 | 17.66 | 17.66 | 17.66 | 17.66 | 17.66 | 17.66 | 17.66 | 17.66 | 17.66 | 17.66 |
| MBS | % | 4.41 | 4.41 | 4.41 | 4.41 | 4.41 | 4.41 | 4.41 | 4.41 | 4.41 | 3.01 | 3.01 | 3.01 |
| SAN | % | 5.49 | 5.49 | 5.49 | 5.49 | 5.49 | 5.49 | 5.49 | 5.49 | 5.49 | 5.49 | 5.49 | 5.49 |
| ST1 | % | 0.1 | 0.1 | 0.1 | 0.1 | 0.1 | 0.1 | 0.1 | 0.1 | 0.1 | 0.1 | 0.1 | 0.1 |
| ST2 | % | 0.2 | 0.2 | 0.2 | 0.2 | 0.2 | 0.2 | 0.2 | 0.2 | 0.2 | 0.2 | 0.2 | 0.2 |
| ST3 | % | 0.5 | 0.5 | 0.5 | 0.5 | 0.5 | 0.5 | 0.5 | 0.5 | 0.5 | 0.5 | 0.5 | 0.5 |
| MR1 | % | 0.4 | 0.44 | 0.5 | 0 | 0 | 0.4 | 0.4 | 0.4 | 0.4 | 0.5 | 0.5 | 0.5 |
| MR2 | % | 0 | 0 | 0 | 0.04 | 0 | 0.04 | 0 | 0 | 0 | 0 | 0.05 | 0 |
| MR3 | % | 0 | 0 | 0 | 0 | 0.1 | 0 | 0.1 | 0 | 0 | 0 | 0 | 0.1 |
| MR4 | % | 0 | 0 | 0 | 0 | 0 | 0 | 0 | 0.04 | 0.1 | 0.5 | 0 | 0 |
| MR5 | % | 0 | 0 | 0 | 0 | 0 | 0 | 0 | 0 | 0 | 0.5 | 0.5 | 0.5 |
| Total | % | 100.4 | 100.44 | 100.5 | 100.04 | 100.1 | 100.44 | 100.5 | 100.44 | 100.5 | 101.5 | 101.05 | 101.1 |

Example 2

The physical and mechanical properties of various inventive and comparative samples were measured at the test conditions summarized in Table 3 and results are summarized in Table 4. These results demonstrated that addition of the mold release additives has little effect on the physical and mechanical properties of the thermoplastic polymer blends. However, comparison of the ejection forces of E1 with that of C1 and C4, and E2 with C1 and C5 demonstrates that addition of the second mold release additives improves the mold release characteristics of the thermoplastic polymer blends. Both E1 and C2 have 0.44 parts of the mold release additive added to the 100 parts of the resin composition. The comparative sample C2 contains the single mold release additive PETS, added in an amount of 0.44 parts to the 100 parts of the resin composition. The inventive sample E1 has two mold release additives in the total amount of 0.44 parts to the 100 parts of the resin composition, 0.4 parts of PETS and 0.04 parts of GMS. The comparison of the ejection forces measured for C2 and E1 and E2 (Table 4) demonstrates that the combination of two mold release additives improves the overall mold release performance of the thermoplastic polymer blend. The comparison of mold release performances of samples E2 and C3, E3 and C2, and E4 and C3 demonstrates that addition of the two mold release additives provides a thermoplastic composition having improved mold release properties when compared to the single mold release additive.

It was also found that the mold release performance of the thermoplastic composition depends on the type of the mold release additive. For example, both inventive samples E3 and E4 contain poly(alfa)olefin (PAO) as a molding release additive. However, increasing the amount of PAO in the thermoplastic polymer blend does not further improve its mold release performance In the samples E5, E6, and C6, the resin composition was kept constant. The comparative sample C6 included the mixture of three mold release additives: PETS, Poly(ethylene oxide-propylene oxide-ethylene oxide) (Pluronic F88), and poly(alfa)olefin (PAO). In the inventive samples E5 and E6, 0.5 parts of PAO was substituted with 0.05 parts of GMS, and 0.1 parts of glycerol tristearate (GTS). It was demonstrated that addition of the small amounts of GMS and GTS as mold release additives results in the better mold release performance of the thermoplastic polymer blend.

The comparison of the ejection forces measured for the blend having various mold release additives is demonstrated in the FIG. 1.

TABLE 3

Tests Description and Units.

| Test | Description | Units |
|---|---|---|
| MVR1 | ASTM D1238, 260° C./5 kg/360 s | $cm^3$/10 min |
| MVR2 | ASTM D1238, 260° C./5 kg/1080 s | $cm^3$/10 min |
| FL. Mod. | Flexural Modulus, ISO 178 | MPa |
| FL. Stren. | Flexural Strength, ISO 178 | MPa |
| HDT | ISO 75, 1.8 MPa, 3.2 mm | ° C. |
| IZOD Duc. 1 | ISO 180, Ductility at 23° C. | % |
| IZOD Im. Stren. 1 | ISO 180, Impact Strength at 23° C. | $kJ/m^2$ |
| IZOD Duc. 2 | ISO 180, Ductility at −30° C. | % |
| IZOD Im. Stren. 2 | ISO 180, Impact Strength at −30° C. | $kJ/m^2$ |
| Ejection Force | SABIC method | |

TABLE 4

Physical and mechanical properties of the inventive and comparative samples.

| Test | C1 | C2 | C3 | C4 | C5 | E1 | E2 |
|---|---|---|---|---|---|---|---|
| MVR1 | 23.9 | 24.8 | 24.3 | 24.5 | 22.4 | 25.7 | 25.6 |
| MVR2 | 28.9 | 27.9 | 26.6 | 23.7 | 22.4 | 26.6 | 28.2 |
| FL. Mod. | 2211 | 2221 | 2224 | 2245 | 2231 | 2216 | 2226 |
| FL. Stren. | 85.11 | 84.43 | 85.6 | 85.46 | 86.17 | 85.75 | 85.4 |
| HDT | 108 | 107 | 106 | 106 | 107 | 107 | 107 |
| IZOD Duc. 1 | 100 | 100 | 100 | 100 | 100 | 100 | 100 |
| IZOD Im. Stren. 1 | 58.02 | 57.57 | 57.07 | 56.35 | 56.85 | 56.19 | 56.96 |
| IZOD Duc. 2 | 100 | 100 | 100 | 100 | 100 | 100 | 100 |
| IZOD Im. Stren. 2 | 27.5 | 34.41 | 33.3 | 48.81 | 51.05 | 34.26 | 29.9 |
| Ejection Force | 15845 | 13170 | 14383 | 13163 | 16492 | 12109 | 12828 |

| Test | E3 | E4 | C6 | E5 | E6 |
|---|---|---|---|---|---|
| MVR1 | 24.8 | 25.2 | 20.4 | 19.5 | 20 |
| MVR2 | 25.8 | 26.6 | 21.4 | 20.8 | 20.8 |
| FL. Mod. | 2240 | 2208 | 2229 | 2231 | 2221 |
| FL. Stren. | 85.37 | 84.36 | 83.53 | 83.23 | 82.35 |
| HDT | 106 | 107 | 104 | 104 | 105 |
| IZOD Duc. 1 | 100 | 100 | 100 | 100 | 100 |
| IZOD Im. Stren. 1 | 55.52 | 56.26 | 66.26 | 75.69 | 59.44 |
| IZOD Duc. 2 | 100 | 100 | 100 | 100 | 100 |
| IZOD Im. Stren. 2 | 48.05 | 35.1 | 55.63 | 59.32 | 58.62 |
| Ejection Force | 12443 | 14136 | 10918 | 10539 | 10555 |

What is claimed is:

1. A thermoplastic composition comprising:
   (a) from about 10 wt % to about 80 wt % of a first polycarbonate;
   (b) an impact modifier composition from about 1 wt % to about 30 wt %, wherein the combined weight percent of components (a) through (b) does not exceed 100 wt %, wherein all weight percent values are based on the total weight of the thermoplastic composition; and
   (c) a mold release composition comprising at least two different mold release additives from about 0.01 parts by weight to about 1.5 parts by weight added to 100 parts by weight of the thermoplastic composition excluding the mold release composition, wherein the at least two different mold release additives comprises pentaerythritol tetrastearate in combination with one or more of glycerol monostearate, glycerol tristearate, poly(alpha) olefin, poly(ethylene oxide-propylene oxide-ethylene oxide), or any combination thereof, wherein the mold release composition has a pentaerythritol tetrastearate ratio of greater than about 4:1 to about 10:1 than a second one of the at least two mold release agents; and
   wherein a molded sample of the thermoplastic composition has better mold release performance compared to a substantially identical reference composition in the absence of the mold release composition, and wherein the presence of the mold release composition has substantially no impact on the mechanical and physical properties.

2. The thermoplastic composition of claim 1, wherein the molded sample of the thermoplastic composition has lower ejection pressure compared to a substantially identical reference composition in the absence of the mold release composition, and wherein the presence of the mold release composition has substantially no impact on the mechanical and physical properties.

3. The thermoplastic composition of claim 1, further comprising a second polycarbonate in an amount in the range from about 10 wt % to about 80 wt %.

4. The thermoplastic composition of claim 1, further comprising a third polycarbonate component in an amount in the range from greater than 0 wt % to about 15 wt %.

5. The thermoplastic composition of claim 4, wherein the third polycarbonate comprises a polycarbonate-polysiloxane copolymer.

6. The thermoplastic composition of claim 1, further comprising a stabilizer composition in an amount in the range from greater than 0 wt % to about 1.5 wt %.

7. The thermoplastic composition of claim 6, wherein the stabilizer composition comprises one or more of heat stabilizers, UV stabilizers, or a combination thereof.

8. The thermoplastic composition of claim 1, wherein the first polycarbonate has a weight average molecular weight in the range from about 18,000 to about 34,000.

9. The thermoplastic composition of claim 8, wherein the first polycarbonate has a weight average molecular weight of about 21,900 Daltons.

10. The thermoplastic composition of claim 3 wherein the second polycarbonate has a weight average molecular weight in the range from about 18,000 to about 34,000.

11. The thermoplastic composition of claim 10, wherein the second polycarbonate has a weight average molecular weight of about 29,900 Daltons.

12. The thermoplastic composition of claim 1, wherein the first polycarbonate comprises 2,2-bis(4-hydroxyphenyl) propane polycarbonate.

13. The thermoplastic composition of claim 3, wherein the second polycarbonate comprises 2,2-bis(4-hydroxyphenyl)propane polycarbonate that is different from the first polycarbonate.

14. The thermoplastic composition of claim 1, wherein the impact modifier composition comprises one or more of an acrylonitrile-butadiene-styrene polymer component, a methyl methacrylate-butadiene-styrene polymer component, a bulk polymerized acrylonitrile-butadiene-styrene polymer, a styrene-acrylonitrile copolymer, a styrene acrylonitrile grafted acrylonitrile-butadiene-styrene component, or any combination thereof.

15. The thermoplastic composition of claim 1, wherein the impact modifier composition comprises one or more of a styrene acrylonitrile grafted acrylonitrile-butadiene-styrene component, a methyl methacrylate butadiene styrene component, or a styrene-acrylonitrile copolymer.

16. The thermoplastic composition of claim 15, wherein a butadiene content in the styrene acrylonitrile grafted acrylonitrile-butadiene-styrene component is in the range from about 10 wt % to about 70 wt %.

17. The thermoplastic composition of claim 16, wherein the butadiene content is at least about 16 wt %.

18. An article made from the thermoplastic composition of claim 1.

19. A thermoplastic composition comprising:
(a) from about 10 wt % to about 40 wt % of a first polycarbonate;
(b) an impact modifier composition from about 1 wt % to about 30 wt %;
(c) a second polycarbonate in an amount in the range from about 20 wt % to about 60 wt %;
(d) from greater than 0 to about 10 wt % of a third polycarbonate comprising a polycarbonate polysiloxane copolymer;
wherein the combined weight percent of components (a) through (d) does not exceed 100 wt %, wherein all weight percent values are based on the total weight of the thermoplastic composition; and
(e) a mold release composition comprising at least two different mold release additives from about 0.01 parts by weight to about 1.5 parts by weight added to 100 parts of the thermoplastic composition excluding the mold release composition, wherein the mold release composition has a pentaerythritol tetrastearate ratio of greater than about 4:1 to about 10:1 than a second one of the at least two different mold release additives; and wherein a molded sample of the thermoplastic composition has better mold release performance compared to a substantially identical reference composition in the absence of the mold release composition, and wherein the presence of the mold release composition has substantially no impact on the mechanical and physical properties.

20. The thermoplastic composition of claim 19, wherein one or more of the at least two different mold release additives comprises one or more of glycerol monostearate, glycerol tristearate, poly(alfa) olefin, poly(ethylene oxide-propylene oxide-ethylene oxide), or any combination thereof.

21. The thermoplastic composition of claim 19 further compromising a stabilizer composition in amount in the range from greater than 0 wt % to about 15 wt %.

22. An article made from the thermoplastic composition of claim 19.

23. A method of making a thermoplastic composition comprising the steps:
(a) providing:
(i) a first polycarbonate in an amount in the range from about 10 wt % to about 80 wt %;
(ii) an impact modifier composition in an amount in the range from about 1 wt % to about 30 wt %;
(b) mixing all components to create a mixture that does not exceed 100 wt %, and wherein all weight percent value are based on the total weight of the thermoplastic composition;
(c) blending a mold release composition in an amount in the range from about 0.01 parts by weight to about 1.5 parts by weight into 100 parts of the mixture excluding the mold release composition to form a thermoplastic composition;
wherein the mold release composition comprises one or more of at least two different mold release additives, wherein the at least two different mold release additives comprises pentaerythritol tetrastearate in combination with glycerol monostearate, glycerol tristearate, poly(alfa) olefin, poly(ethylene oxide-propylene oxide-ethylene oxide), or any combination thereof; wherein the at least two different mold release additives comprise pentaerythritol tetrastearate in a ratio of greater than about 4:1 to about 10:1 to a second one of the at least two mold release additives; and wherein a molded sample of the thermoplastic composition has better mold release performance compared to a substantially identical reference composition in the absence of the mold release composition, and wherein the presence of the mold release composition has substantially no impact on the mechanical and physical properties; and wherein the molded sample of the thermoplastic composition has lower ejection pressure compared to a substantially identical reference composition in the absence of the mold release composition, and wherein the presence of the mold release composition has substantially no impact on the mechanical and physical properties.

24. The method of claim 23, further comprising providing a second polycarbonate in step (a) in an amount in the range from about 10 wt % to about 80 wt %.

25. The method of claim 23, further comprising step (d) extruding the thermoplastic composition.

26. The method of claim 23, further comprising providing a third polycarbonate component in step (a) in an amount in the range from greater than 0 wt % to about 15 wt %.

27. The method of claim 26, wherein the third polycarbonate comprises a polycarbonate-polysiloxane copolymer.

28. The method of claim 23, further providing a stabilizer composition in step (a) in an amount in the range from greater than 0 wt % to about 1.5 wt %.

29. The method of claim 28, wherein the stabilizer composition comprises one or more of heat stabilizers, UV stabilizers, or a combination thereof.

30. A method of making a thermoplastic composition comprising the steps:
   (a) providing:
      (i) a first polycarbonate in an amount in the range from about 10 wt % to about 40 wt %;
      (ii) a second polycarbonate in an amount in the range from about 20 wt % to about 60 wt %, wherein the second polycarbonate is different from the first polycarbonate;
      (iii) an impact modifier composition in an amount in the range from about 1 wt % to about 30 wt %;
      (iv) a third polycarbonate composition comprising a polycarbonate-polysiloxane copolymer in an amount in the range from greater than 0 to about 10 wt %;
   (b) mixing all components to create a mixture that does not exceed 100 wt %, and wherein all weight percent value are based on the total weight of the thermoplastic composition;
   (c) blending a mold release composition in an amount in the range from about 0.01 parts by weight to about 1.5 parts by weight into 100 parts of the mixture excluding the mold release composition to form a thermoplastic composition;
   wherein the mold release composition comprises at least two mold release agents and wherein the mold release composition has a pentaerythritol tetrastearate ratio of greater than 4:1 to about 10:1 than a second one of the at least two mold release agents; and
   wherein a molded sample of the thermoplastic composition has better mold release performance compared to a substantially identical reference composition in the absence of the mold release composition, and wherein the presence of the mold release composition has substantially no impact on the mechanical and physical properties.

31. The method of claim 30 further comprising step (d) extruding the thermoplastic composition.

32. The method of claim 30, wherein one or more of the at least two different mold release additives comprises pentaerythritol tetrastearate, glycerol monostearate, glycerol tristearate, poly(alfa) olefin, poly(ethylene oxide-propylene oxide-ethylene oxide), or any combination thereof.

33. The method of claim 30, wherein a molded sample of the thermoplastic composition has lower ejection pressure compared to a substantially identical reference composition in the absence of the mold release composition, and wherein the presence of the mold release composition has substantially no impact on the mechanical and physical properties.

* * * * *